United States Patent
Kodama et al.

(10) Patent No.: US 9,004,312 B2
(45) Date of Patent: *Apr. 14, 2015

(54) ROLLER SHUTTER TYPE STORAGE CONTAINER

(71) Applicant: Toyoda Gosei Co., Ltd., Kiyosu-shi, Aichi-ken (JP)

(72) Inventors: Yasuhiro Kodama, Kiyosu (JP); Masataka Inoue, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,363

(22) Filed: Oct. 8, 2013

(65) Prior Publication Data
US 2014/0042166 A1    Feb. 13, 2014

Related U.S. Application Data

(63) Continuation of application No. 13/186,542, filed on Jul. 20, 2011, now Pat. No. 8,579,151.

(30) Foreign Application Priority Data

Jul. 30, 2010   (JP) ................................. 2010-171413
Dec. 27, 2010   (JP) ................................. 2010-290131

(51) Int. Cl.
*B65D 43/14*   (2006.01)
*B65D 43/20*   (2006.01)
(Continued)

(52) U.S. Cl.
CPC ................. *A45C 13/16* (2013.01); *B65D 43/20* (2013.01)

(58) Field of Classification Search
CPC ........................................................ A45C 13/16
USPC ............. 160/231.1, 230, 231.2, 236, 233, 37, 160/133, 130, 201, 202, 238; 220/812, 811, 220/810, 250, 246, 351, 345.1, 345.4, 350; 312/297, 307, 304.26; 108/44
See application file for complete search history.

(56) References Cited

U.S. PATENT DOCUMENTS 3,326,268 A * 6/1967 Dixon ........................ 160/231.2
4,162,024 A   7/1979 Shanley
(Continued)

FOREIGN PATENT DOCUMENTS

JP     08-192685 A     7/1996
JP     2002-087167 A   3/2002
(Continued)

OTHER PUBLICATIONS

Extended European Search Report issued by the European Patent Office mailed on Dec. 6, 2011 in the corresponding European patent application No. 11173198.0.
(Continued)

*Primary Examiner* — Fenn Mathew
*Assistant Examiner* — Don M Anderson
(74) *Attorney, Agent, or Firm* — Posz Law Group, PLC

(57) ABSTRACT

A roller shutter type storage container includes a container body, a roller shutter accommodating portion, a pair of guide grooves, and a roller shutter. Each of the guide grooves extends linearly in an opening of the container body and is curved in the roller shutter accommodating portion. The roller shutter is configured by connecting a plurality of slats each having shafts formed in the widthwise direction at two ends of the slat in a bendable manner. As the two shafts slide in the corresponding guide grooves, the roller shutter slides between an open position and a close position. Each one of the shafts is spaced from a vertical wall surface of the corresponding one of the guide grooves. A projection formed of soft material projects outward from each shaft of each slat in the widthwise direction and contacts the corresponding vertical wall surface in an elastically deformed state.

14 Claims, 14 Drawing Sheets

(51) Int. Cl.
*E06B 9/00* (2006.01)
*E06B 9/08* (2006.01)
*E06B 3/12* (2006.01)
*E06B 9/15* (2006.01)
*A45C 13/16* (2006.01)

(56) References Cited

U.S. PATENT DOCUMENTS 5,582,381 A * 12/1996 Graf et al. ............... 248/430
6,499,785 B2   12/2002 Eguchi
6,672,554 B2 *  1/2004 Fukuo .................... 248/311.2
6,833,852 B1   12/2004 Maess et al.
7,735,538 B2    6/2010 Ogawa
2004/0118851 A1 * 6/2004 Shinomiya ............... 220/345.1

FOREIGN PATENT DOCUMENTS

JP   2003-090186 A    3/2003
JP   2006-291510 A   10/2006
JP   2010-084378 A    4/2010
WO   02/052177 A1     7/2002

OTHER PUBLICATIONS

Office Action mailed Jan. 28, 2014 issued in corresponding JP patent application No. 2010-290131.

* cited by examiner

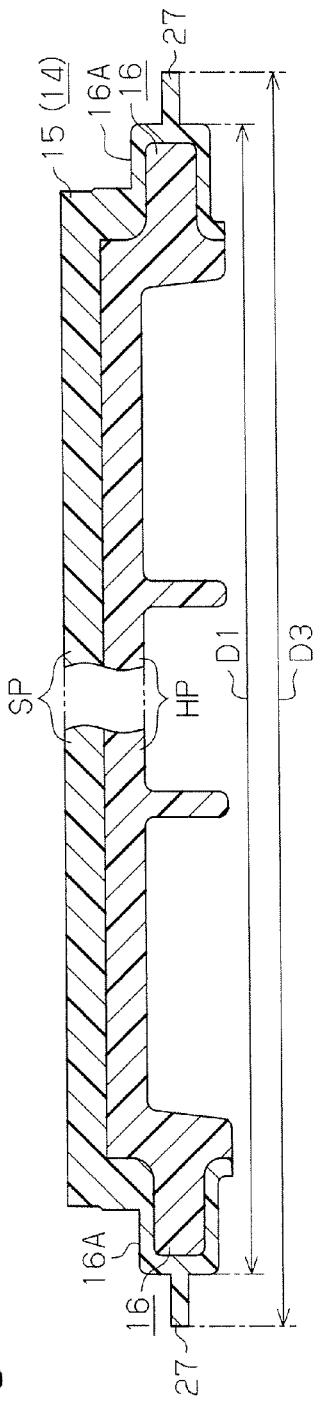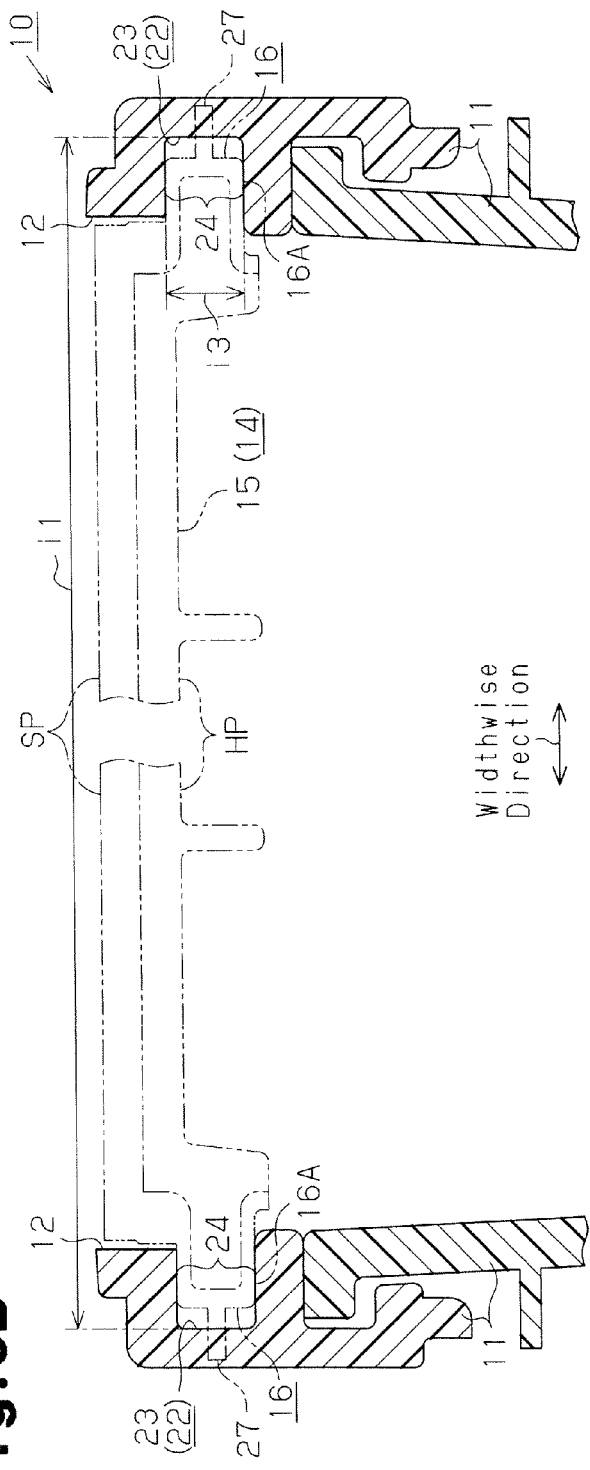

ROLLER SHUTTER TYPE STORAGE CONTAINER

CROSS-REFERENCE TO RELATED APPLICATION

This application is a continuation application of U.S. application Ser. No: 13/186,542, now U.S. Pat. No. 8,579,151 filed Jul. 19, 2011 entitled ROLLER SHUTTER STORAGE CONTAINER.

BACKGROUND OF THE INVENTION

The present invention relates to a roller shutter type storage container having an opening in a container body that is selectively opened and closed by sliding a roller shutter in guide grooves.

A roller shutter type storage container may be used as a storage container mounted in a center console of a vehicle. Refer to Japanese Laid-Open Patent Publications No. 2003-90186 and No. 2002-87167. The roller shutter type storage container includes a container body, a roller shutter accommodating portion, a pair of guide grooves, and a roller shutter. The container body has an upper opening. Objects or items may be placed in or removed from the storage container through the opening. The roller shutter accommodating portion accommodates the roller shutter at an unobtrusive position. The roller shutter accommodating portion is arranged in the exterior of the container body and at a position adjacent to the container body. The guide grooves are formed on both sides of the container body and the opening of the body in the widthwise direction of the container body. Specifically, the widthwise direction is a direction perpendicular to the arrangement direction of the container body and the roller shutter accommodating portion. Each of the guide grooves is defined by a vertical wall surface extending substantially perpendicular to the widthwise direction and a pair of opposing lateral wall surfaces extending substantially perpendicular to the vertical wall surface. At the opening, each guide groove extends linearly as a whole. In contrast, in the roller shutter accommodating portion, at least a portion of the guide groove is curved in such a manner as to minimize the accommodating space for the roller shutter.

The roller shutter has a plurality of slats, which are arranged in the arrangement direction of the container body and the roller shutter accommodating portion. Each adjacent pair of the slats is connected together in a bendable manner. A shaft is provided at either end of each of the slat in the widthwise direction and extends outward in the widthwise direction. By sliding the shafts of each slat in the corresponding guide grooves, the roller shutter is moved between an open position, at which the roller shutter is accommodated in the roller shutter accommodating portion to open the opening, and a close position, at which the roller shutter extends out from the roller shutter accommodating portion to close the opening.

Each of the shafts includes a projection formed of soft material, which projects toward at least one of the upper and lower lateral wall surfaces. The projection is referred to as a "contact portion" in Japanese Laid-Open Patent Publication No. 2003-90186 and a "bumper portion" in Japanese Laid-Open Patent Publication No. 2002-87167. Each one of the projections is joined to the corresponding one of the shafts at the two ends of the projection in the arrangement direction of the container body and the roller shutter accommodating portion. Each projection is formed in an arcuate shape in such a manner as to become more spaced from the corresponding shaft as the distance from the ends of the projection increases, and most spaced from the shaft at the middle position of the projection. The projections contact the corresponding lateral wall surface of the guide groove in an elastically deformed manner.

In the above-described roller shutter type storage container, the opening is selectively opened and closed by sliding the roller shutter between the open position and the close position. During this, the two shafts of each slat slide in the guide grooves. In other words, when the shafts slide in the guide grooves while being guided by the guide grooves, the roller shutter is caused to slide to selectively open and close the opening. Sliding resistance is produced between each projection and the corresponding lateral wall surface when the roller shutter slides, thus causing load on sliding operation of the roller shutter, which is operational load. The operational load is a factor that greatly influences operational sensation when the roller shutter is operated and is thus important.

In the conventional roller shutter type storage container in which the projections of the shafts project toward the corresponding lateral wall surface, each projection must deform to follow the shape of the curved portion of the corresponding guide groove when passing through the curved portion. This correspondingly increases the sliding resistance generated between the projection and the lateral wall surface compared to the sliding resistance produced when the shaft proceeds in the linear portion of the guide groove. As a result, even though the sliding resistance between each projection and the corresponding guide groove is appropriate in the linear portion of the guide groove, the sliding resistance becomes excessively great in the curved portion of the guide groove.

The operational load thus increases when the shafts slide in the curved portions of the guide grooves in the roller shutter accommodating portion, compared to when the shafts slide in the linear portions of the guide grooves in the opening. This deteriorates the operational sensation. The operational load becomes even greater as the number of shafts sliding in the curved portions of the guide grooves increased, or, in other words, as the opening becomes greater.

Also, the sliding resistance in the curved portion of each guide groove becomes greater as the radius of curvature of the curved portion becomes greater, or, in other words, as the curved portion curves to a greater extent. As a result, the operational sensation is deteriorated with more significance in the guide grooves having a greater radius of curvature.

SUMMARY OF THE INVENTION

Accordingly, it is an objective of the present invention to provide a roller shutter type storage container that improves operational sensation by stabilizing operational load, which is caused when a roller shutter is operated to slide, regardless of shaft positions in guide grooves.

To achieve the foregoing objective and in accordance with one aspect of the present invention, a roller shutter type storage container is provided that includes a container body having an opening, a roller shutter accommodating portion arranged along a first direction so as to be adjacent to the container body, a pair of guide grooves, and a roller shutter. The guide grooves are formed in the opening of the container body and the roller shutter accommodating portion at both sides in the widthwise direction, which is a second direction perpendicular to the first direction. Each of the guide grooves forms a straight shape in the opening. At least a portion of each guide groove is curved in the roller shutter accommodating portion. The guide grooves extend along the first direction. A roller shutter is guided by the two guide grooves. The roller shutter includes a plurality of slats arranged along the first direction and connected together in a bendable manner. Each of the slats has two ends in the second direction and shafts at the ends. As the shafts of each of the slats slide in the corresponding guide grooves, the roller shutter slides between an open position, at which the roller shutter is accommodated in the roller shutter accommodating portion to open the opening, and a close position, at which the roller shutter extends out from the roller shutter accommodating portion to close the opening. Each of the guide grooves has a vertical wall surface extending in a direction substantially perpendicular to the second direction. Each one of the shafts is spaced from the corresponding one of the vertical wall surfaces. The shafts of at least some of the slats have projections formed of soft material and projecting outward along the second direction. Each of the projections is held in contact with the corresponding vertical wall surface in an elastically deformed state.

In accordance with another aspect of the present invention, a roller shutter type storage container is provided that includes a container body having an opening, a roller shutter accommodating portion arranged along first direction so as to be adjacent to the container body, a pair of guide grooves, and a roller shutter. The guide grooves are formed in the opening of the container body and the roller shutter accommodating portion at both sides in the widthwise direction, which is a second direction perpendicular to the first direction. Each of the guide grooves forms a straight shape in the opening. At least a portion of each guide groove is curved in the roller shutter accommodating portion. The guide grooves extend along the first direction. A roller shutter is guided by the two guide grooves. The roller shutter includes a plurality of slats arranged along the first direction and connected together in a bendable manner. Each of the slats having two ends in the second direction and shafts at the ends. As the shafts of each of the slats slide in the corresponding guide grooves, the roller shutter slides between an open position, at which the roller shutter is accommodated in the roller shutter accommodating portion to open the opening, and a close position, at which the roller shutter extends out from the roller shutter accommodating portion to close the opening. The roller shutter has an ornamental surface with respect to the thickness direction. Each adjacent pair of the slats is connected together through a hinge. The hinges are located between the shafts of the slats and the ornamental surface. A rib formed of soft material is arranged between each one of the slats and at least one of the two adjacent slats, the rib restricting movement of the shafts of the corresponding slats.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5A and 5B are cross-sectional views each showing a portion of the roller shutter type storage container of the first embodiment to illustrate dimensions of different components;

DETAILED DESCRIPTION OF THE PREFERRED EMBODIMENTS (First Embodiment)

A first embodiment of a roller shutter type storage container according to the present invention, which is mounted in a center console of a vehicle, will now be described with reference to FIGS. 1 to 8. For the description below, the proceeding (advancing) direction of the vehicle is defined as the forward direction and the reverse direction of the vehicle is defined as the rearward direction.

Figure 1:
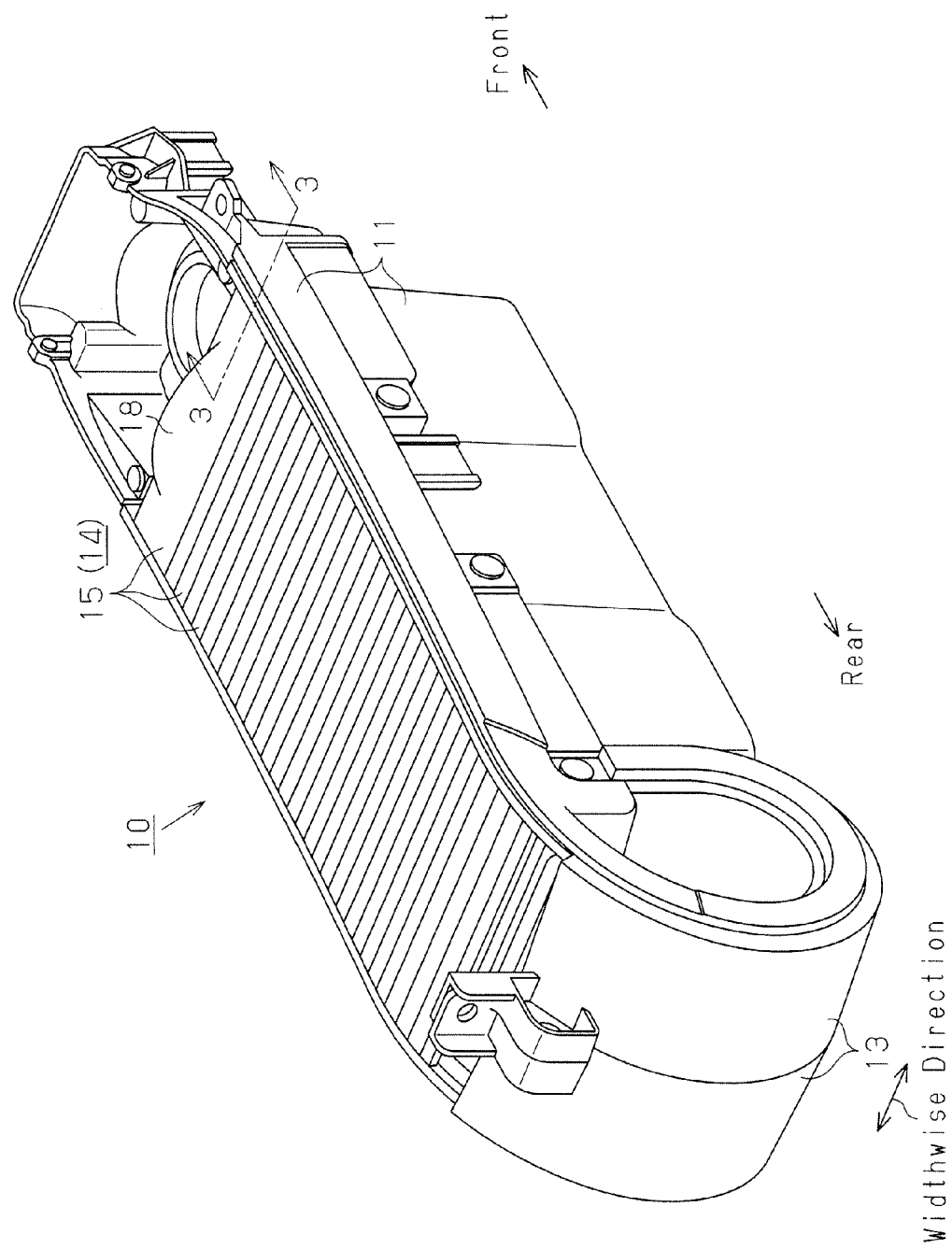
FIG. 1 is a perspective view showing a roller shutter type storage container as a whole according to a first embodiment of the present invention.
Figure 2:
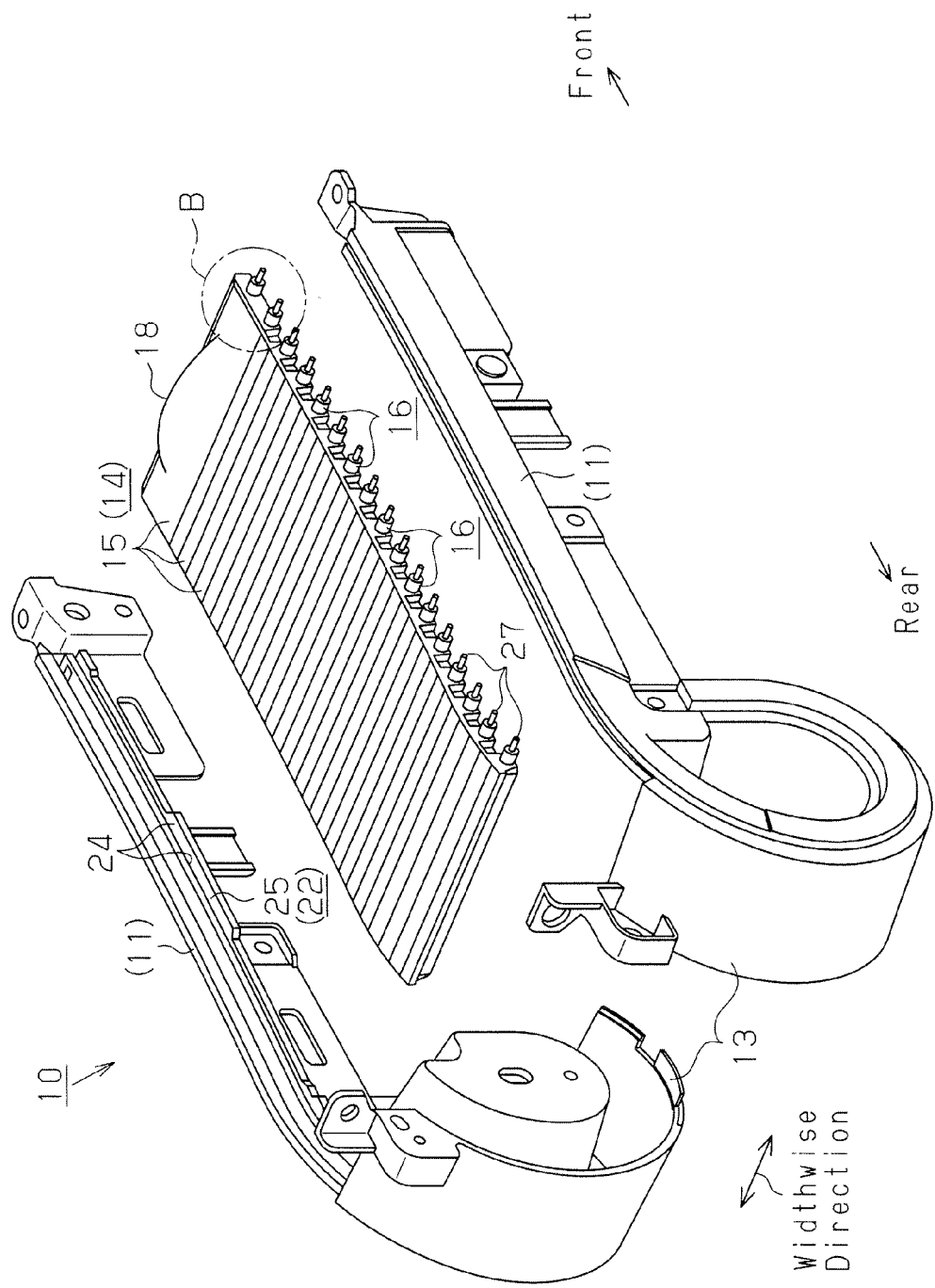
FIG. 2 is an exploded perspective view showing main components of the roller shutter type storage container illustrated in FIG. 1.

A center console is arranged on the floor at a position between the driver's seat and the adjacent passenger seat in a vehicle. Operational portions such as a shift lever and a parking brake lever are provided in the center console. A roller shutter type storage container 10, which is shown in FIGS. 1 and 2, is also mounted in the center console.

The roller shutter type storage container 10 includes a container body 11, a roller shutter accommodating portion 13, a pair of guide grooves 22, and a roller shutter 14.

The container body 11 accommodates, for example, drink containers or small objects and has an elongated shape extending in a forward-rearward direction. The container body 11 has an opening 12 formed at the upper end of the container body 11 (FIG. 5B). Small items and the like are placed in and removed from the container body 11 through the opening 12.

The roller shutter accommodating portion 13 accommodates the roller shutter 14 at an unobtrusive position when the opening 12 is open. In the first embodiment, the roller shutter accommodating portion 13 is arranged behind the container body 11 at a position adjacent to the container body 11. In other words, the roller shutter accommodating portion 13 and the container body 11 are arranged adjacent to each other along a first direction.

Figure 3:
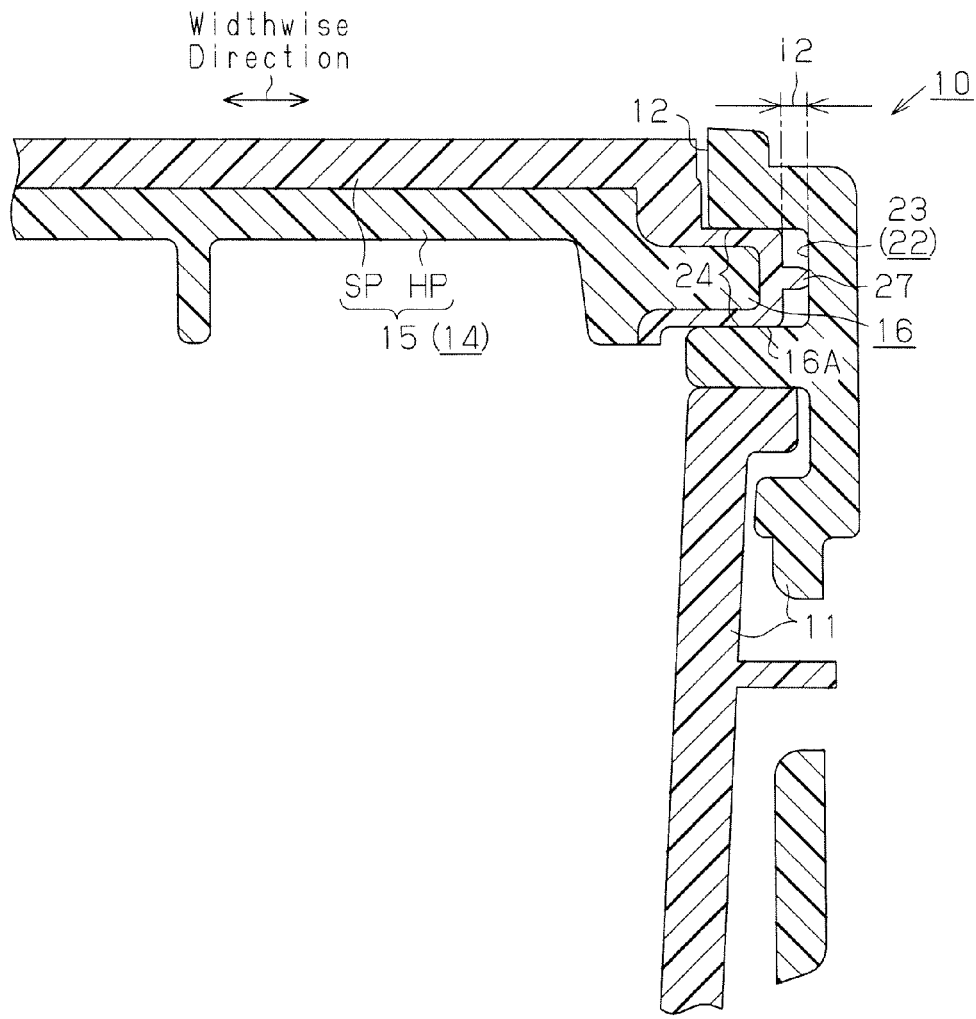
FIG. 3 is an enlarged cross-sectional view taken along line 3-3 of FIG. 1.

The guide grooves 22 are formed in the opening 12 of the container body 11 and the roller shutter accommodating portion 13 at both sides in the widthwise direction as a second direction, which is the direction of the width of the vehicle. The widthwise direction as the second direction is a direction perpendicular to the arrangement direction of the container body 11 and the roller shutter accommodating portion 13. In other words, the widthwise direction is a direction perpendicular to the first direction. As illustrated in FIGS. 3 and 5B, the inner wall surfaces of each of the guide grooves 22 includes a vertical wall surface 23 extending substantially perpendicular to the widthwise direction and a pair of opposing lateral wall surfaces 24 each extending substantially perpendicular to the vertical wall surface 23.

Figure 6:
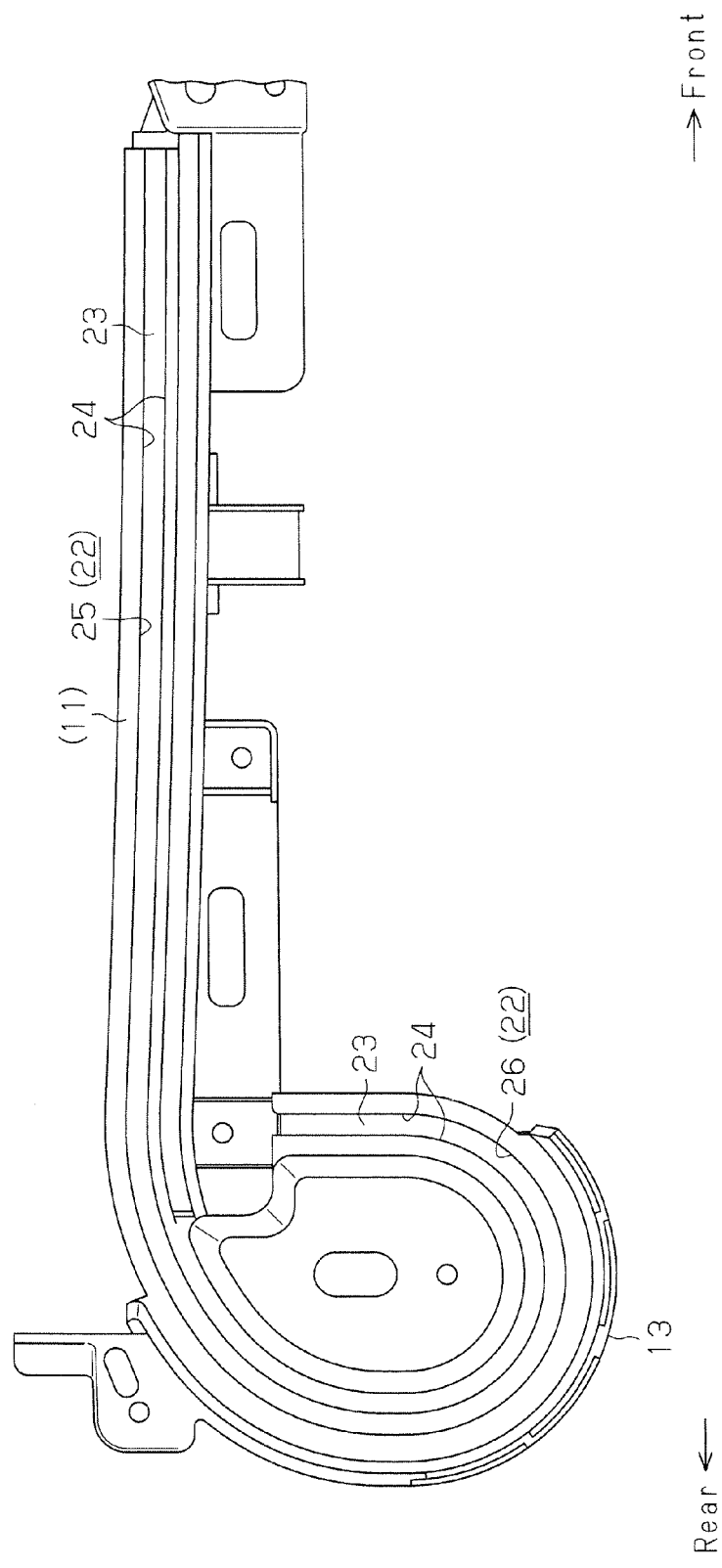
FIG. 6 is a side view illustrating the shape of a guide groove of the first embodiment.

As illustrated in FIG. 6, a portion of each guide groove 22 in the opening 12 is shaped differently from a portion of the guide groove 22 in the roller shutter accommodating portion 13. The portion of the guide groove 22 in the opening 12 is substantially as a whole shaped linearly. This portion of the guide groove 22 will hereafter be referred to as a "linear portion 25". The two lateral wall surfaces 24 of each guide groove 22 oppose each other in the opening 12 in the upward-downward direction. The vertical wall surface 23 and the lateral wall surfaces 24 of each guide groove 22 extend linearly along the arrangement direction of the container body 11 and the roller shutter accommodating portion 13, or, in other words, the forward-rearward direction.

Contrastingly, the portion of each guide groove 22 in the roller shutter accommodating portion 13 is curved by a comparatively great radius of curvature in such a manner as to minimize the accommodating space occupied by the roller shutter 14. Specifically, the portion of the guide groove 22 in the roller shutter accommodating portion 13 is curved substantially as a whole. The portion of the guide groove 22 in the roller shutter accommodating portion 13 forms a substantially annular shape as a whole. This portion of each guide groove 22 will hereafter be referred to as a "curved portion 26". In the roller shutter accommodating portion 13, the two lateral wall surfaces 24 are curved as faced to each other in a radial direction.

The vertical wall surfaces 23 of each guide groove 22 are shaped flat both in the opening 12 and the roller shutter accommodating portion 13.

Figure 7:
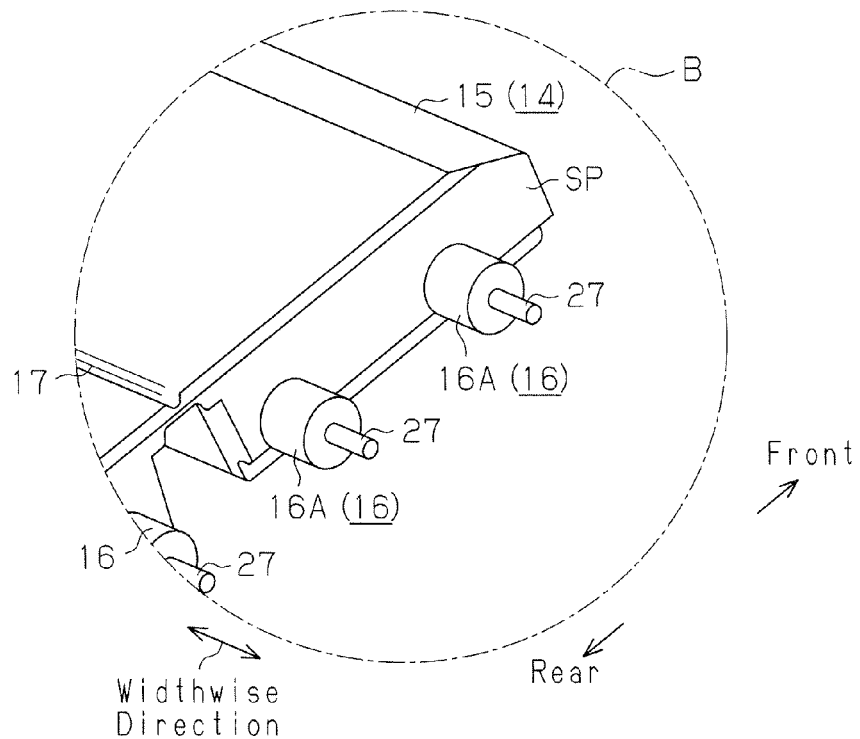
FIG. 7 is an enlarged perspective view showing the portion B of FIG. 2.

With reference to FIGS. 1 and 2, the roller shutter 14 has a plurality of slats 15, which are arranged along the arrangement direction of the container body 11 and the roller shutter accommodating portion 13, which is the forward-rearward direction. Each of the slats 15 has a laterally elongated shape extending in the widthwise direction. A hinge 17 having a thickness smaller than the thickness of each slat 15 and extending in the widthwise direction is arranged between each adjacent pair of the slats 15 (FIG. 7). Each adjacent pair of the slats 15 are connected together in a bendable manner through the corresponding one of the hinges 17.

Figure 4:
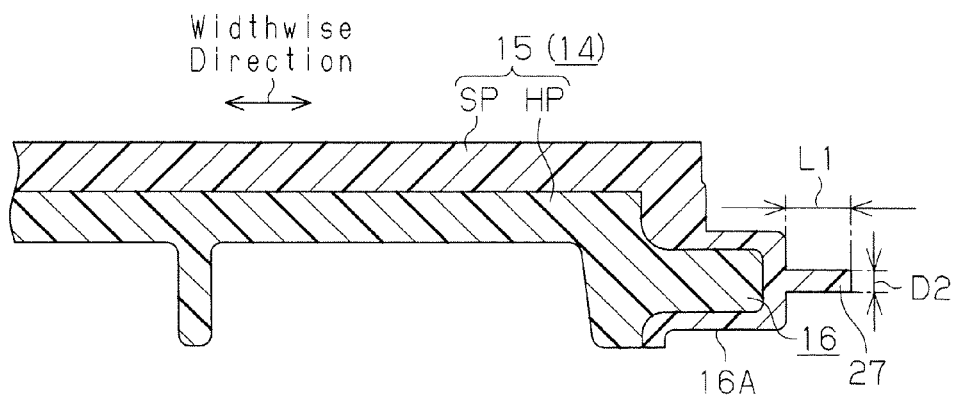
FIG. 4 is an enlarged cross-sectional view showing a portion of FIG. 3, which includes, specifically, a slat, a shaft, and a projection.

Shafts 16 each extending in the corresponding guide groove 22 outward in the widthwise direction are formed at both ends of the slats 15 in the widthwise direction. As illustrated in FIGS. 3 to 5, each shaft 16 of each slat 15 has a columnar shape and is slidably arranged in the corresponding guide groove 22. The outer peripheral surface of each shaft 16 is formed by a curved surface (a cylindrical surface) 16A, which is curved at a uniform radius of curvature. Each shaft 16 has an outer diameter that is slightly smaller than the interval i3 (FIG. 5B) between the two lateral wall surfaces 24 of each guide groove 22. The shaft 16 linearly contacts the lateral wall surfaces 24 by means of the curved surface 16A while maintaining the original shape (the columnar shape), or, in other words, substantially without elastically deforming.

The distance D1 (FIG. 5A) from the distal end of one of the shafts 16 of each slat 15 to the distal end of the other shaft 16 is set to a value slightly smaller than the interval i1 (FIG. 5B) between the vertical wall surfaces 23 of the two opposing guide grooves 22. In this configuration, the two shafts 16 of each slat 15 are spaced from the vertical wall surfaces 23 of the corresponding guide grooves 22 at a slight interval (which is, in the first embodiment, approximately 1 mm).

The slats 15 and the shafts 16 are each configured by a hard portion HP formed of hard material and a soft portion SP formed of soft material arranged around the hard portion HP. The hard material may be, for example, hard resin such as ABS (acrylonitrile-butadiene-styrene polymer) or polypropylene. The soft material may be, for example, different types of elastomers such as polyester elastomers or polypropylene elastomers. The slats 15 and the shafts 16 each have a core portion (a skeleton portion) formed by the hard portion HP. The hard portions HP thus ensure rigidity and strength necessary for the roller shutter 14. The slats 15 and the shafts 16 each have a surface layer portion formed by the soft portion SP. The hinges 17 are also formed by the soft portions SP. The soft portions SP thus provide flexibility and bendability for the roller shutter 14.

The slats 15 and the shafts 16, which are configured by the hard portions HP and the soft portions SP, are manufactured by, for example, a two-color molding.

As illustrated in FIGS. 1 and 2, the foremost one of the slats 15 has a forward-rearward dimension greater than the corresponding dimension of the other slats 15. The foremost slat 15 has a holding portion 18, which is for a user to hold with the user's fingers and operate the roller shutter 14 to slide.

The roller shutter 14, which is formed by joining the slats 15 together, has a substantially rectangular shape as viewed from above. As the shafts 16 of each slat 15 slide in the corresponding guide grooves 22, the roller shutter 14 slides between an open position (not shown) and a close position (FIG. 1). When arranged at the open position, the roller shutter 14 is received in the roller shutter accommodating portion 13 to open the opening 12. When at the close position, the roller shutter 14 extends out from the roller shutter accommodating portion 13 to close the opening 12.

Figure 8:
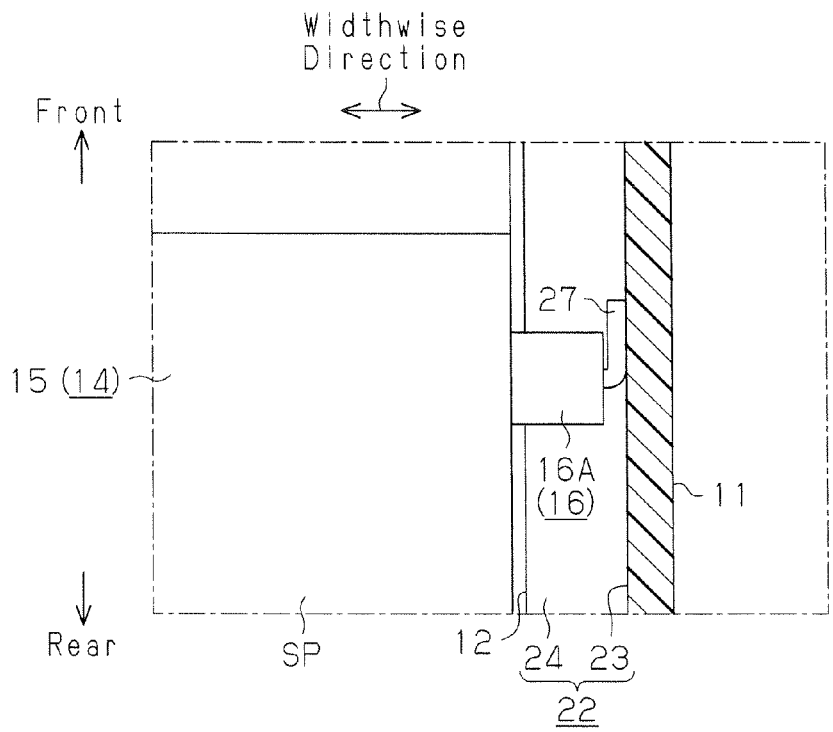
FIG. 8 is a cross-sectional plan view showing a portion of the first embodiment, which includes a rod-like projection that elastically deforms and slides on a vertical wall surface of the guide groove.

As illustrated in FIGS. 3 to 5 and FIG. 7, each shaft 16 has a projection 27 projecting outward in the widthwise direction. The distance D3 (FIG. 5A) from the distal end of one of the two projections 27 of each slat 15 to the distal end of the other projection 27 is set to a value greater than the interval i1 (FIG. 5B) between the two vertical wall surfaces 23. The projections 27 contact the corresponding vertical wall surfaces 23 in an elastically deformed shape (FIGS. 3 and 8). The projections 27 are formed of the same type of soft material (elastomer) as the aforementioned material of each soft portion SP integrally with the corresponding soft portions SP. In the first embodiment, each of the projections 27 has a round rod-like shape extending linearly outward from the associated one of the shafts 16 in the widthwise direction before elastic deformation and exhibits improved flexibility. Each projection 27 has the outer diameter D2 (FIG. 4), which is substantially uniform (in the first embodiment, approximately 1 mm) throughout the entire portion of the projection 27 in the longitudinal direction thereof. It is preferable to set the length L1 (FIG. 4) of each projection 27 to a value that is 1.5 times as great as the interval i2 (FIG. 3) between each shaft 16 and the vertical wall surface 23 of the corresponding guide groove 22 or greater. In the first embodiment, the interval i2 is approximately 1 mm and the length L1 of each projection 27 is approximately 3 mm. Each projection 27 contacts the corresponding vertical wall surface 23 while held in a state flexibly bent at the boundary portion (the basal portion) of the projection 27 with respect to the associated shaft 16.

Grease is applied onto the vertical wall surface 23 and the two lateral wall surfaces 24 of each guide groove 22. The grease on each vertical wall surface 23 decreases friction between the corresponding projection 27 and the vertical wall surface 23 when the roller shutter 14 slides. The grease on each lateral wall surface 24 reduces friction between the corresponding shaft 16 and the lateral wall surface 24 when the roller shutter 14 slides.

Operation of the roller shutter type storage container 10 of the first embodiment, which is configured as described above, will hereafter be described.

With reference to FIGS. 3 and 8, in the roller shutter type storage container 10, each shaft 16 linearly contacts the lateral wall surfaces 24 of the corresponding guide groove 22 by means of the outer peripheral surface of the shaft 16, which is formed by the curved surface 16A, substantially without elastically deforming. Each shaft 16 is spaced from the vertical wall surface 23 of the corresponding guide groove 22 at the predetermined interval i2 (approximately 1 mm). Each projection 27, which has the rod-like shape extending outward from the associated shaft 16 in the widthwise direction, linearly contacts the corresponding vertical wall surface 23 in a flexibly bent state at the boundary portion of the projection 27 with respect to the shaft 16. Each projection 27 produces such a force (elastic shape restoration force) that the projection 27 restores its original shape (the straight extending rod-like shape), which extends linearly from the shaft 16 in an outward direction in the widthwise direction. The projection 27 is thus pressed against the vertical wall surface 23.

When an object or item is to be placed in or removed from the container body 11, the roller shutter 14 is operated to slide between the open position (not shown) at which the roller shutter 14 is accommodated in the roller shutter accommodating portion 13 to open the opening 12 and the close position (FIG. 1) at which the roller shutter 14 extends out from the roller shutter accommodating portion 13 to close the opening 12. In this state, the shafts 16 of each slat 15 slide in the corresponding guide grooves 22. Specifically, when the shafts 16 slide in the corresponding guide grooves 22 while being guided by the guide grooves 22, the roller shutter 14 is caused to slide to selectively open and close the opening 12. At this stage, each shaft 16 slides on the corresponding lateral wall surfaces 24 by means of the curved surface 16A, or, in other words, the outer peripheral surface of the shaft 16. The sliding resistance between the shaft 16 and each lateral wall surface 24 is thus small. The load on sliding operation of the roller shutter 14, which is operational load, is caused mainly by the sliding resistance between each projection 27 and the vertical wall surface 23 of the corresponding guide groove 22 when the roller shutter 14 slides.

For a case in which the projection 27 projecting from each shaft 16 is held in contact with the lateral wall surfaces 24 (as in the case of the conventional technique), the sliding resistance between the projection 27 and each lateral wall surface 24 increases in the curved portion 26 of the corresponding guide groove 22 compared to the sliding resistance in the linear portion 25 of the guide groove 22. Such increase of the sliding resistance is caused by each elastically deformed projection 27 that slides on the lateral wall surfaces 24 in a manner following the curved shape of each lateral wall surface 24. The sliding resistance in the curved portion 26 becomes greater as the radius of curvature of the curved portion 26 becomes greater. This increases the operational load when the shafts 16 slide in the curved portions of the corresponding guide grooves 22 in the roller shutter accommodating portion 13, compared to when the shafts 16 slide in the linear portions of the guide grooves 22 in the opening 12. As a result, operational sensation is deteriorated.

In contrast, in the first embodiment, the projections 27, each of which is to restore its original shape from the flexibly bent shape, slide on the corresponding vertical wall surfaces 23. Unlike the lateral wall surfaces 24, each vertical wall surface 23 is non-curved and flat. This prevents the increase of the sliding resistance that is caused by the elastically deformed projections 27 that slide on the curved portions of the lateral wall surfaces 24. Specifically, in the curved portions of the guide grooves 22 in the roller shutter accommodating portion 13, the sliding resistance in the case in which the projections 27 slide on the vertical wall surfaces 23 is smaller than the sliding resistance in the case in which the projections 27 slide on the lateral wall surfaces 24. As a result, the operational load is prevented from being increased when the shafts 16 slide in the curved portions of the guide grooves 22 in the roller shutter accommodating portion 13 compared to when the shafts 16 slide in the linear portions of the guide grooves 22 in the opening 12.

In the wall surfaces of each guide groove 22, the vertical wall surface 23, which is held in contact with the projections 27 maintained in the elastically deformed states, is flat regardless of the radius of curvature of each lateral wall surface 24. This ensures the above-described operation regardless of the radius of curvature of the curved portion 26 of the guide groove 22. In this regard, the first embodiment is greatly different from the case (the conventional technique) in which the projections 27 projecting from the shafts 16 contact the curved portions of the lateral wall surfaces 24 and the sliding resistance becomes greater as the radius of curvature of the curved portions become greater. As a result, effectiveness of the first embodiment over the conventional technique becomes more pronounced as the radius of curvature of the curved portion 26 of each guide groove 22 becomes greater.

The first embodiment, which has been described in detail, has the advantages described below.

(1) In the roller shutter type storage container 10 in which the portion of each guide groove 22 in the roller shutter accommodating portion 13 is curved substantially as a whole (FIG. 6), each shaft 16 is spaced from the vertical wall surface 23 of the corresponding guide groove 22 (FIG. 3). The shafts 16 each include the projection 27, which is formed of the soft material and projects from the associated shaft 16 outward in the widthwise direction. Each projection 27 contacts the vertical wall surface 23 in the elastically deformed state, or, in other words, the flexibly bent state (FIG. 8).

This prevents the sliding resistance produced between each projection 27 and the wall surface of the corresponding guide groove 22 from being increased in the curved portion 26 in the roller shutter accommodating portion 13. The operational load is thus prevented from being increased when the shafts 16 slide in the curved portions of the guide grooves 22 in the roller shutter accommodating portion 13. This stabilizes the operational load when the roller shutter 14 is operated to slide regardless of the position of each shaft 16 in the corresponding guide groove 22, thus improving the operational sensation.

This advantage becomes more pronounced as the radius of curvature of each guide groove 22 of the roller shutter type storage container 10 becomes greater.

(2) Each projection 27 is formed in the rod-like shape extending from the associated shaft 16 outward in the widthwise direction (FIG. 7).

As a result, by causing the projections 27 to linearly contact the corresponding vertical wall surfaces 23 each in a flexibly bent state (FIG. 8) and slide on the vertical wall surfaces 23 as the roller shutter 14 slides, operational load on the roller shutter 14 is produced in a simple manner.

(3) The length L1 of each projection 27 is set to the value that is 1.5 times as great as the interval i2 between each shaft 16 and the vertical wall surface 23 of the corresponding guide groove 22 or greater (FIGS. 3 and 4).

This allows the projections 27 to linearly contact the corresponding vertical wall surfaces 23 each in the flexibly bent state, thus causing an appropriate level of sliding resistance between each projection 27 and the corresponding vertical wall surface 23 when the shafts 16 slide in the guide grooves 22. As a result, the advantage (2) is reliably brought about.

(4) By changing at least one of the outer diameter D2 and the length L1 in each projection 27 in FIG. 4, the operational load is easily adjusted.

(Second Embodiment)

Figure 9:
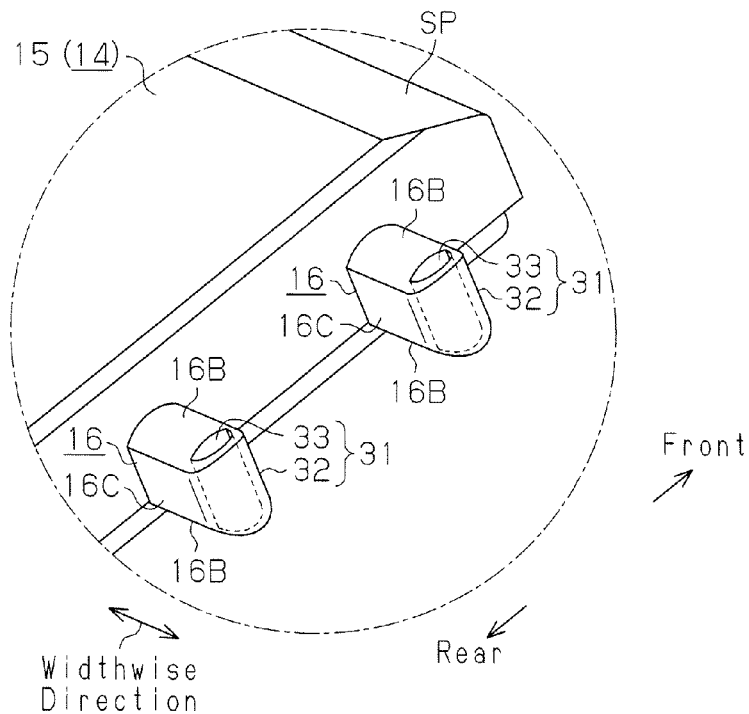
FIG. 9 is a partial perspective view corresponding to FIG. 7, showing a roller shutter type storage container according to a second embodiment of the present invention, specifically, showing a portion including a slat, a shaft, and a projection.

A roller shutter type storage container according to a second embodiment of the present invention will hereafter be described with reference to FIGS. 9 to 11.

The second embodiment is different from the first embodiment in terms of the shape of each shaft 16 and the configuration of a projection 31.

In the first embodiment, the outer peripheral surface of each shaft 16 as a whole is configured by the curved surface 16A (FIG. 7). Contrastingly, in the second embodiment, as illustrated in FIG. 10B, the portions of each shaft 16 that contact the lateral wall surfaces 24 of the corresponding guide groove 22, which are two opposing portions, are each formed by a curved surface 16B. In the outer peripheral surface of each shaft 16, the two portions between the two curved surfaces 16B are configured by opposing parallel flat surfaces 16C.

With reference to FIG. 10B, unlike the projections 27 of the first embodiment having a rod-like shape, each of the projections 31 of the second embodiment is configured by a plate-like portion 32 and a hollow portion 33. The plate-like portion 32 is connected to the shaft 16 at two ends 32E in the aforementioned extending dimension, that is, the forward-rearward direction. The plate-like portion 32 has a substantially arcuate shape as viewed from above before being elastically deformed in such a manner that the plate-like portion 32 becomes more spaced from the shaft 16 in the arrangement direction, which is the forward-rearward direction, at positions more separated from the ends 32E. The plate-like portion 32 is most spaced from the shaft 16 at the center of the plate-like portion 32 in the arrangement direction, or the forward-rearward direction. The hollow portion 33 is formed by the space between the shaft 16 and the plate-like portion 32 and facilitates elastic deformation of the plate-like portion 32.

Same or like reference numerals are given to portions and components of the second embodiment that are the same or like corresponding portions and corresponding components of the first embodiment. Detailed description of the portions and components will be omitted herein.

To place or remove an object in or from the container body 11 of the roller shutter type storage container 10 of the second embodiment, which is configured as described above, the roller shutter 14 is operated to slide in the same manner as the first embodiment.

Figure 11:
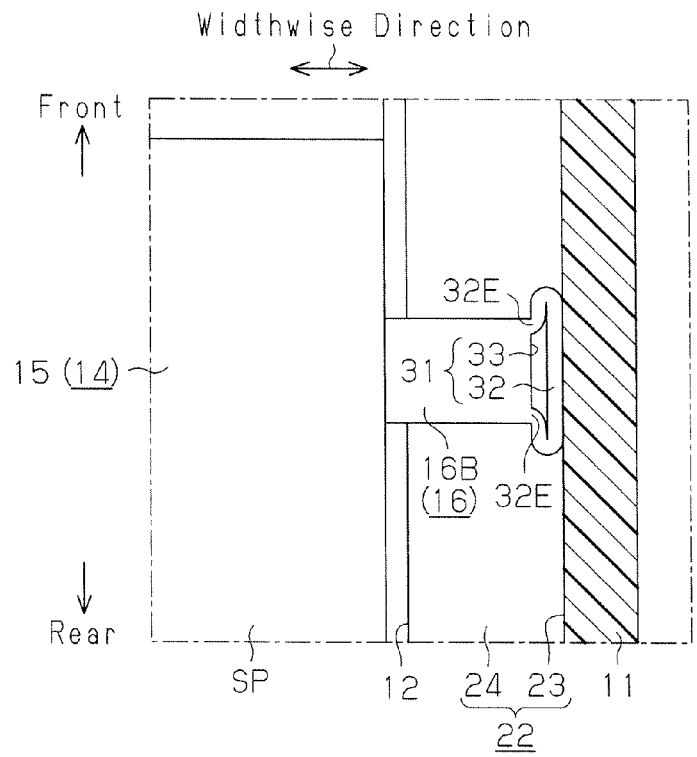
FIG. 11 is a cross-sectional plan view showing a portion of the second embodiment, which includes a projection that elastically deforms and slides on a vertical wall surface of a guide groove.

The second embodiment is different from the first embodiment in that each plate-like portion 32, which extends from the associated shaft 16 outward in the widthwise direction, flexes toward the shaft 16 in the portions of the plate-like portion 32 other than the two ends 32E, thus contacting the corresponding vertical wall surface 23 in an elastically deformed state and by a greater contact surface area (FIG. 11). As the roller shutter 14 slides, the plate-like portion 32, which is to restore its original shape (the substantially arcuate shape as viewed from above), slides on the vertical wall surface 23. This generates an appropriate level of sliding resistance between each projection 31 and the vertical wall surface 23, thus producing operational load on the roller shutter 14 in a desirable manner.

As a result, the second embodiment has advantages similar to those of the first embodiment despite the fact that the projections 31 elastically deform in the different manner from that of the first embodiment. Also, the second embodiment has the advantages described below instead of the advantages (2) and (3).

Figure 10A:
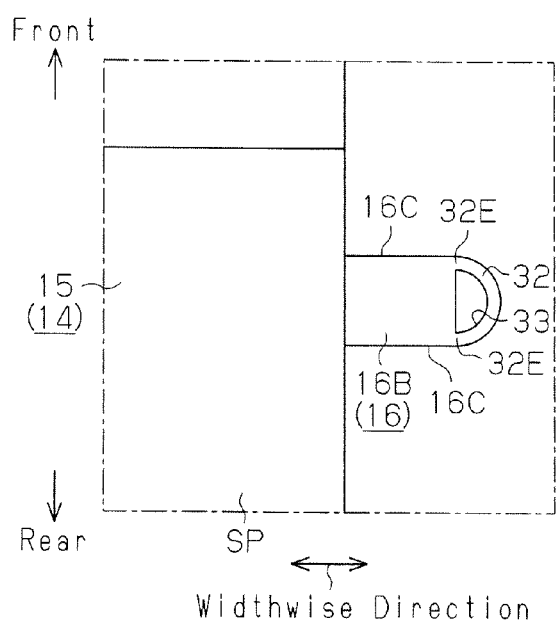
FIG. 10A is a plan view showing a portion of FIG. 9.
Figure 10B:
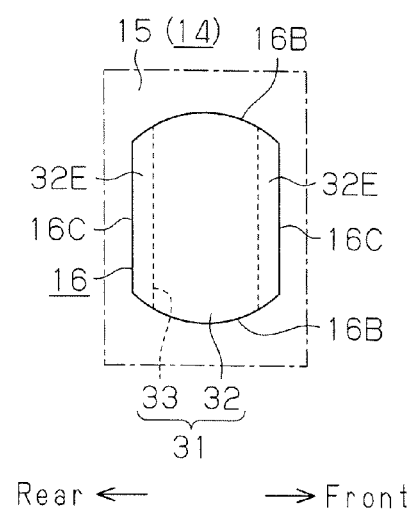
FIG. 10B is a side view showing a portion of FIG. 9.

(5) Each projection 31 is configured by the plate-like portion 32, which is connected to the associated shaft 16 at the two ends 32E in the arrangement direction of the container body 11 and the roller shutter accommodating portion 13, which is the forward-rearward direction, and the hollow portion 33 between the shaft 16 and the plate-like portion 32 (FIG. 10A).

Each plate-like portion 32 flexes toward the associated shaft 16 to contact the corresponding vertical wall surface 23 by a comparatively greater contact surface area (FIG. 11). In this state, the projections 31 are caused to slide on the corresponding vertical wall surfaces 23 as the roller shutter 14 slides. As a result, the operational load on the roller shutter 14 is produced in a simple manner.

(Third Embodiment)

A roller shutter type storage container according to a third embodiment of the present invention will now be described with reference to FIG. 12.

In the third embodiment, the lateral wall surfaces 24 of the guide grooves 22 are subjected to surface roughening to increase surface roughness, or, in other words, form rough surfaces. As the surface roughening, honing or graining, for example, is employed. After the surface roughening, grease is applied on the lateral wall surfaces 24.

The configuration of the components other than the lateral wall surfaces 24 of the third embodiment is identical to the corresponding configuration of the first embodiment. Same or like reference numerals are given to portions and components of the third embodiment that are the same as or like corresponding portions and components of the first embodiment. Detailed description of the portions and components are omitted herein.

In the configuration in which the shafts 16 slide in the guide grooves 22, the shafts 16 must slide repeatedly as the roller shutter 14 slides. This decreases the grease between the shafts 16 and the lateral wall surfaces 24 of the guide grooves 22. The shafts 16 thus may directly contact the lateral wall surfaces 24 and slide, producing noise (friction noise).

However, since the lateral wall surfaces 24 are formed rough in the third embodiment, the contact surface area between each shaft 16 and the associated lateral wall surface 24 is small compared to the case in which the lateral wall surfaces 24 are mirror surfaces. As a result, even after the grease decreases through sliding of the shafts 16, each lateral wall surface 24 contacts the associated shafts 16 each by a reduced contact surface area. This reduces the noise caused by sliding of the shafts 16.

In the lateral wall surfaces 24 having the roughness increased through the surface roughening, some of the grease is received in small-sized recesses. The grease does not easily separate from the recesses. This improves grease holding performance compared to the case in which the lateral wall surfaces 24 are formed as mirror surfaces.

The third embodiment has the advantage described below in addition to advantages similar to the advantages (1) to (4).

Figure 12:
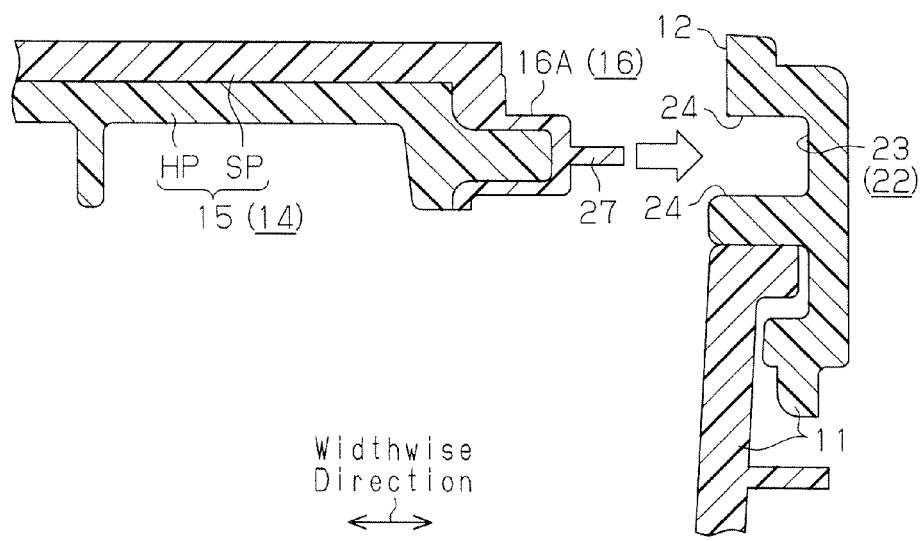
FIG. 12 is a partial cross-sectional view showing a roller shutter type storage container according to a third embodiment of the present invention, specifically, showing the relationship between a guide groove and a slat.
Figure 13:
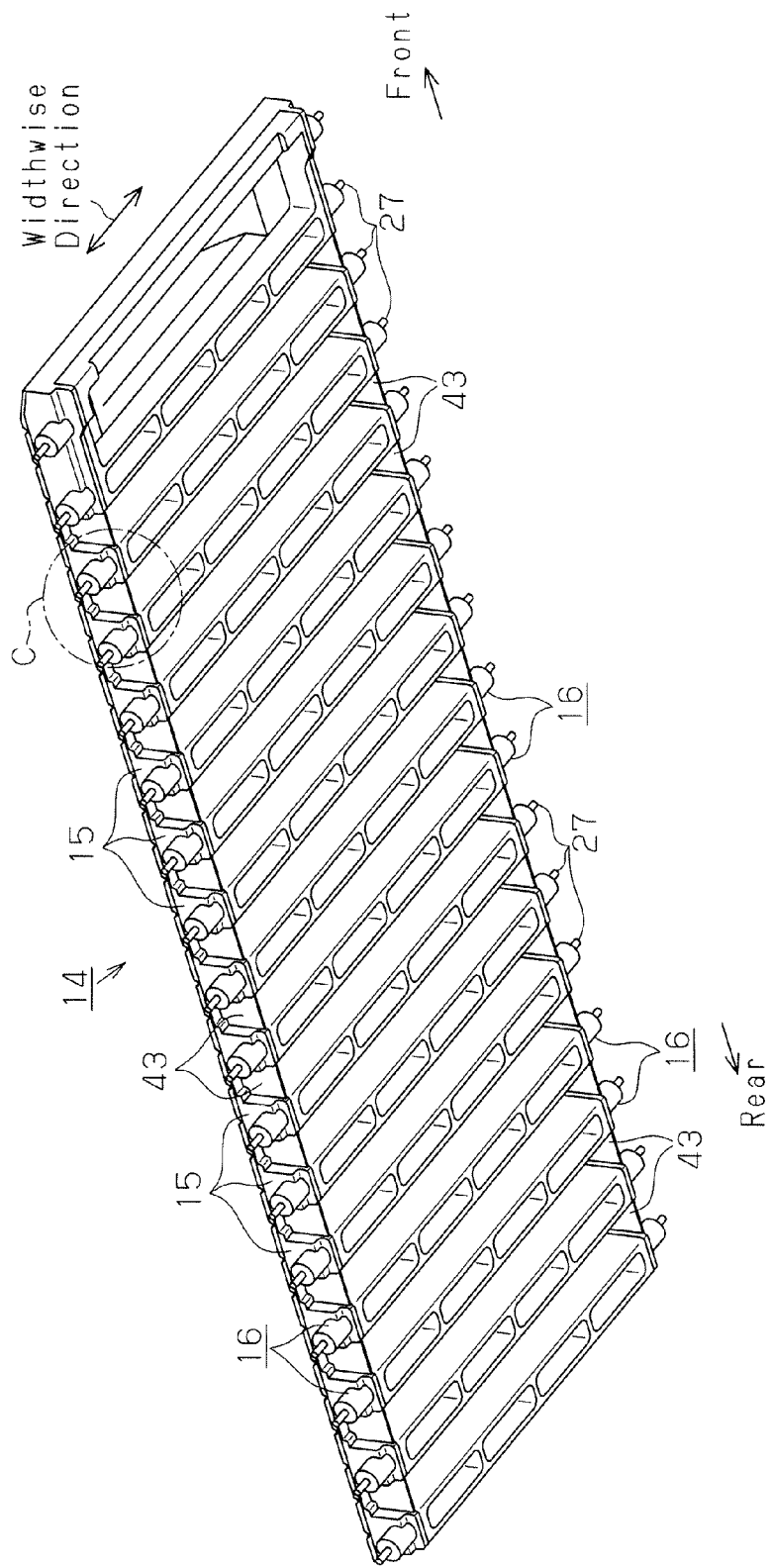
FIG. 13 is a perspective view showing a roller shutter type storage container according to a fourth embodiment of the present invention, specifically showing a roller shutter as viewed from below.

(6) The lateral wall surfaces 24 of the guide grooves 22 are subjected to the surface roughening and the grease is applied on the lateral wall surfaces 24 (FIG. 12).

This decreases the surface contact area between each lateral wall surface 24 and each shaft 16, thus decreasing the noise caused through sliding of the shafts 16.

The grease holding performance of the lateral wall surfaces 24 is also enhanced, thus prolonging the time of lubrication with grease, and improving durability.

(Fourth Embodiment)

A roller shutter type storage container according to a fourth embodiment of the present invention will hereafter be described with reference to FIGS. 13 to 19.

First, the background of the characteristics of the fourth embodiment will be described.

As has been described, in the roller shutter type storage container 10 of the first to third embodiments, the roller shutter 14 is operated to slide between the open position and the close position in such a manner as to selectively open and close the opening 12. In this state, movement of each one of the slats 15 along the guide grooves 22 is transmitted to the adjacent one of the slats 15 through the hinge 17 (FIG. 7).

Also, in this state, the shafts 16 of each slat 15 slide in the corresponding guide grooves 22. Specifically, the shafts 16 are guided by the guide grooves 22 and slide in the guide grooves 22, thus allowing the roller shutter 14 to slide and selectively open and close the opening 12.

In the roller shutter type storage container 10 of the first to third embodiments, to allow the roller shutter 14 to slide, a clearance is formed between each shaft 16 and the corresponding one of the two lateral wall surfaces 24 of the corresponding guide groove 22.

The roller shutter type storage container 10 of the first to third embodiments satisfies the condition 1, which is described below.

Condition 1: Each adjacent pair of the slats 15 are connected together through the corresponding hinge 17, which is arranged in the vicinity of the ornamental surface (the upper surface) of the roller shutter 14 in the thickness direction (a substantially upward-downward direction as viewed in FIG. 7). The hinges 17 are located between the shafts 16 of the slats 15 and the ornamental surface. The shafts 16 of each slat 15 are arranged at the side spaced from the hinge 17 in the thickness direction (at a substantially lower side as viewed in FIG. 7).

When the roller shutter 14 is operated to slide in the roller shutter type storage container 10 that meets the condition 1, each shaft 16 vibrates in the corresponding guide groove 22 and thus contacts and separates from the lateral wall surfaces 24 of the guide groove 22. This may cause noise (rattling noise). Such noise occurs more often in the linear portion 25 of each guide groove 22 than in the curved portion 26. Specifically, when each shaft 16 slides in the curved portion 26, the shaft 16 tends to be pressed against one of the lateral wall surfaces 24. In contrast, when the shaft 16 slides in the linear portion 25, the shaft 16 does not tend to be pressed against only one of the lateral wall surfaces 24 unlike the case of the curved portion 26.

The noise (the rattling noise) may be generated not only in the roller shutter type storage container 10 having the projections 27 projecting from the shafts 16, but also in a roller shutter type storage container without projections 27.

Figure 18:
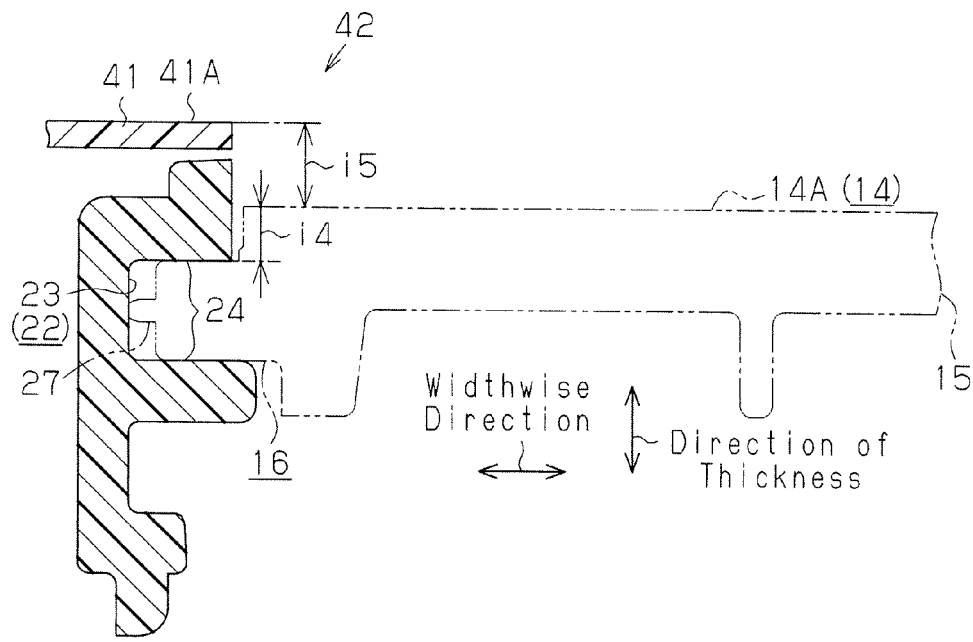
FIG. 18 is a cross-sectional view showing a portion of a comparative example in which hinges and shafts are arranged in middle portions in the thickness direction of a roller shutter, showing the relationship between the position of an upper surface of a cover (an ornamental panel) and the position of an ornamental surface of the roller shutter.

Noise (the rattling noise) may be prevented from being generated by arranging the hinges 17 and the shafts 16 each at a central position in the thickness direction of the roller shutter 14 (the upward-downward direction in FIG. 18). In other words, the noise (the rattling noise) may be reduced by arranging the hinges 17 and the shafts 16 on a line extending along the arrangement direction of the container body 11 and the roller shutter accommodating portion 13.

Specifically, movement of each one of the slats 15 along the guide grooves 22 is transmitted to the adjacent one of the slats 15 through the shafts 16 of the slat 15, the hinge 17 between the two slats 15, and the shafts 16 of the adjacent slat 15. In this state, moment acting to rotate the slats 15 about the hinge 17 acting as a fulcrum is not easily produced. This prevents the shafts 16 from vibrating in the guide grooves 22.

When the hinges 17 and the shafts 16 are arranged at the central positions in the thickness direction of the roller shutter 14 as in the above-described case (FIG. 18), a gap 42 between an upper surface 41A of a cover (an ornamental panel) 41 covering the guide grooves 22 from above and an ornamental surface 14A of the roller shutter 14 is enlarged. Specifically, as the shafts 16 are arranged at the central positions in the thickness direction of the roller shutter 14, the interval i4 between the ornamental surface 14A of the roller shutter 14 and each shaft 16 is reduced. Accordingly, with the shafts 16 engaged with the corresponding guide grooves 22, the height of the ornamental surface 14A is decreased and the interval i5 between the upper surface 41A of the cover (the ornamental panel) 41 and the ornamental surface 14A is increased. The increased interval i5 enlarges the gap 42 to a great extent, thus deteriorating the appearance of the roller shutter type storage container 10.

Figure 17:
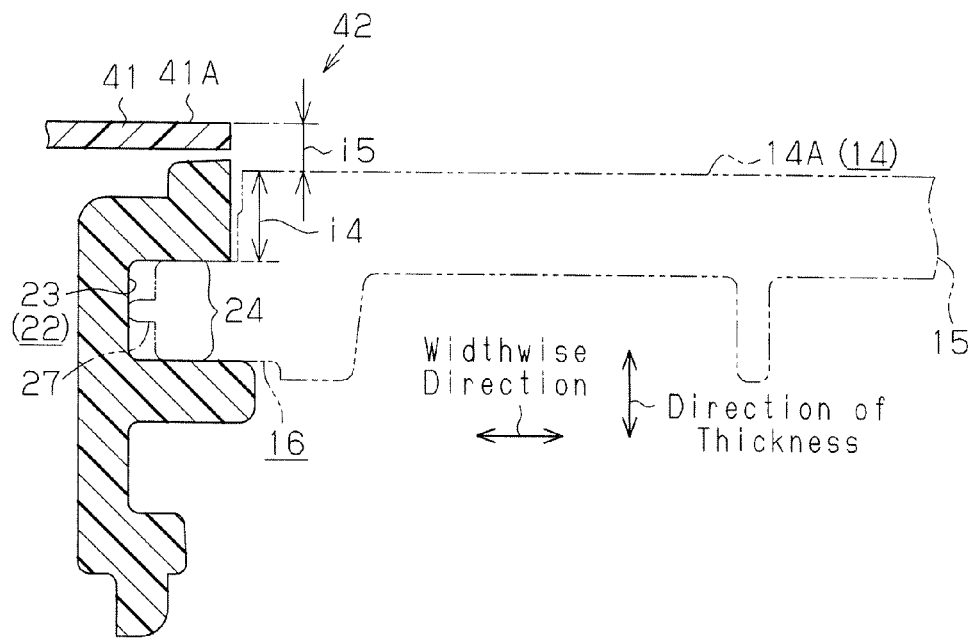
FIG. 17 is a cross-sectional view showing a portion of the fourth embodiment to represent the relationship between an upper surface of a cover (an ornamental panel) and an ornamental surface of the roller shutter.

In the first to third embodiments, as illustrated in FIG. 17, the hinges 17 are arranged in the vicinity of the ornamental surface 14A in the thickness direction of the roller shutter 14 (the upward-downward direction in FIG. 17) and the shafts 16 are arranged at the side spaced from the hinges 17 in the aforementioned direction (at a lower side in FIG. 17). This arrangement increases the interval i4 between the ornamental surface 14A of the roller shutter 14 and each shaft 16. Accordingly, with the shafts 16 engaged with the guide grooves 22, the position of the ornamental surface 14A is raised and thus the interval i5 between the upper surface 41A of the cover (the ornamental panel) 41 and the ornamental surface 14A is reduced. The gap 42 is thus reduced in size correspondingly and the appearance of the roller shutter type storage container 10 improves.

Considering the above-described background, the fourth embodiment employs a configuration that ensures the advantages of the above-described roller shutter type storage container 10, in which the hinges 17 are arranged in the vicinity of the ornamental surface 14A in the thickness direction of the roller shutter 14 and the shafts 16 are located at the side spaced from the hinges 17, and prevents generation of noise (rattling noise).

Figure 19:
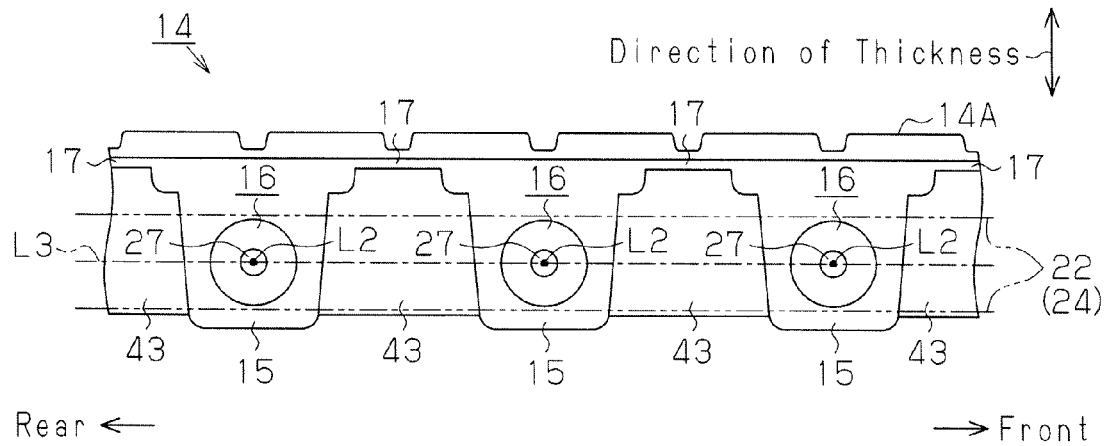
FIG. 19 is a side view showing a portion of the roller shutter of the fourth embodiment.

In the description of the first to third embodiments, detailed description of arrangement of the hinges 17 and the shafts 16 has been omitted. In the fourth embodiment, as illustrated in FIG. 19, each adjacent pair of the slats 15 are connected together through the corresponding one of the hinges 17 as in the first to third embodiments. The hinges 17 are arranged in the vicinity of the ornamental surface 14A in the thickness direction of the roller shutter 14 (the upward-downward direction in FIG. 19). More specifically, the hinges 17 are arranged at positions spaced slightly downward from the ornamental surface 14A (the upper surface in FIG. 19). The thickness of each hinge 17 is smaller than the thicknesses of the other portions of each slat 15.

The shafts 16 of each slat 15 are arranged at the side spaced from the hinges 17 in the thickness direction of the roller shutter 14 (at a lower side in FIG. 19). Each shaft 16 is located at a position separated downward from the central position in the aforementioned thickness direction, which is, in the fourth embodiment, a position closer to a lower portion of the slat 15.

Figure 14:
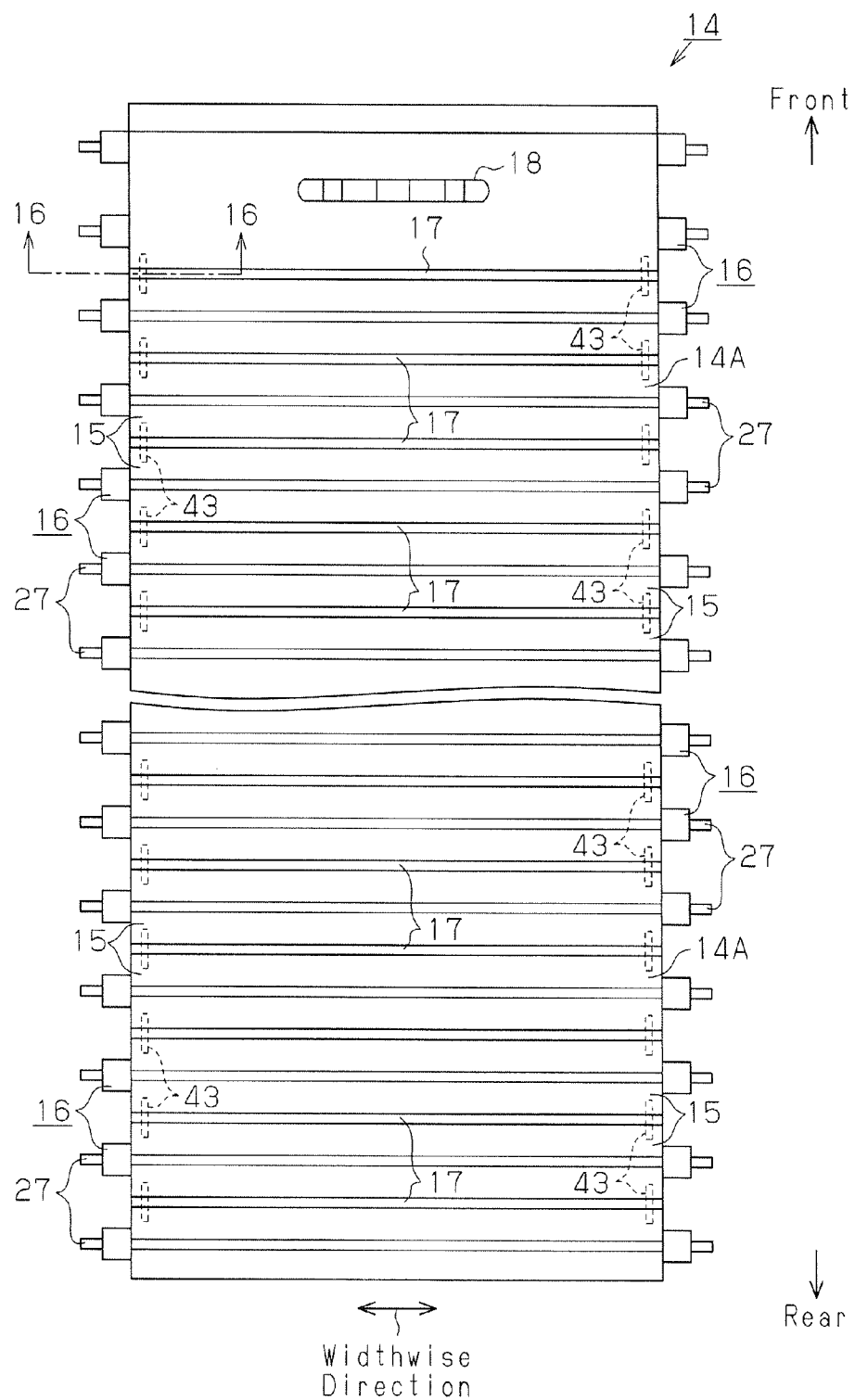
FIG. 14 is a plan view, with a part cut away, showing the fourth embodiment with a portion of a roller shutter omitted.

With reference to FIGS. 13 to 16, a flat plate-like rib 43, which is formed of soft material as in the case of the soft portions SP and restricts movement of the corresponding shafts 16 of the slats 15, is arranged between each one of the slats 15 and each of adjacent slat 15. With reference to FIG. 14, the ribs 43 are formed for all adjacent pairs of the slats 15. One pair of the ribs 43 are provided for each adjacent pair of the slats 15. The ribs 43 are arranged at both ends of each of the corresponding slats 15 in the widthwise direction and located in the vicinity of the corresponding shaft 16.

Each rib 43 is formed integrally with the corresponding soft portion SP of the roller shutter 14. As illustrated in FIG. 16, the thickness T1 of each rib 43 in the widthwise direction is set to a small value. Such small thickness T1 and the soft material forming the ribs 43 allow the rib 43 to elastically deform in the widthwise direction as represented by the lines formed by a long dash alternating with two short dashes in FIG. 15.

As illustrated in FIG. 19, each rib 43 is located at least in correspondence with the space between the axes L2 of the corresponding shafts 16 and the associated hinge 17 in the thickness direction of the roller shutter 14 (the upward-downward direction in FIG. 19). In the fourth embodiment, the ribs 43 are extended to the side spaced from the hinges 17 compared to the axes L2 of the shafts 16 (a lower side in FIGS. 16 and 19) in the thickness direction of the roller shutter 14. As viewed in the thickness direction of the roller shutter 14, the ribs 43 are formed in correspondence with the entire portions of the slats 15.

In FIG. 19, the line formed by a long dash alternating with one short dash represented by the reference numeral L3 is a line connecting the axes L2 of the adjacent shafts 16 in the forward-rearward direction. The same line L3 is used for illustrations of FIGS. 20 and 21, which will be described later.

Except for the above-described configuration, the fourth embodiment is the same as the first and third embodiments. Same or like reference numerals are given to portions and components of the fourth embodiment that are the same as or like corresponding portions and components of the first and third embodiments. Detailed description of the portions and components is omitted herein.

In the fourth embodiment configured as described above, when the roller shutter 14 is operated to slide, movement of each slat 15 along the guide grooves 22 is transmitted to the corresponding adjacent slat 15 through the associated hinge 17 as illustrated in FIG. 19. At this stage, the shafts 16 of each slat 15 slide in the corresponding guide grooves 22. In other words, as the shafts 16 are guided by the guide grooves 22 and slide in the guide grooves 22, the roller shutter 14 is caused to slide and selectively opens and closes the opening 12.

As has been described, in the roller shutter type storage container 10 that satisfies the aforementioned condition 1 and does not include ribs 43, moment acting to rotate each slat 15 about the associated hinge 17 acting as a fulcrum may be produced when the roller shutter 14 is operated to slide.

However, in the fourth embodiment, the ribs 43 exist between each adjacent pair of the slats 15 and restrict movement (vibration) of the corresponding shafts 16. This prevents each shaft 16 from contacting and separating from the lateral wall surfaces 24 of the corresponding guide groove 22.

Particularly in the fourth embodiment, in each adjacent pair of the slats 15 that are arranged adjacently through the corresponding ribs 43, a portion of each rib 43 is arranged in the space between the axes L2 of the corresponding adjacent shafts 16. The portion of the rib 43 between the axes L2 transmits movement along the guide groove 22 between the shafts 16. This prevents the moment acting to rotate the slat 15 about the hinge 17 acting as a fulcrum from being produced. Vibration of the shafts 16 in the corresponding guide grooves 22 is thus decreased and the shafts 16 are reliably prevented from contacting and separating from the lateral wall surfaces 24 of the guide grooves 22.

Further, in the fourth embodiment, each rib 43 has a portion located in the space between the axes L2 of the corresponding shafts 16 and the associated hinge 17 and the portion in the space spaced from the hinge 17 compared to the axes L2 (a lower side in FIG. 19). These portions of the rib 43 further restrict movement (vibration) of the shafts 16.

Figure 15:
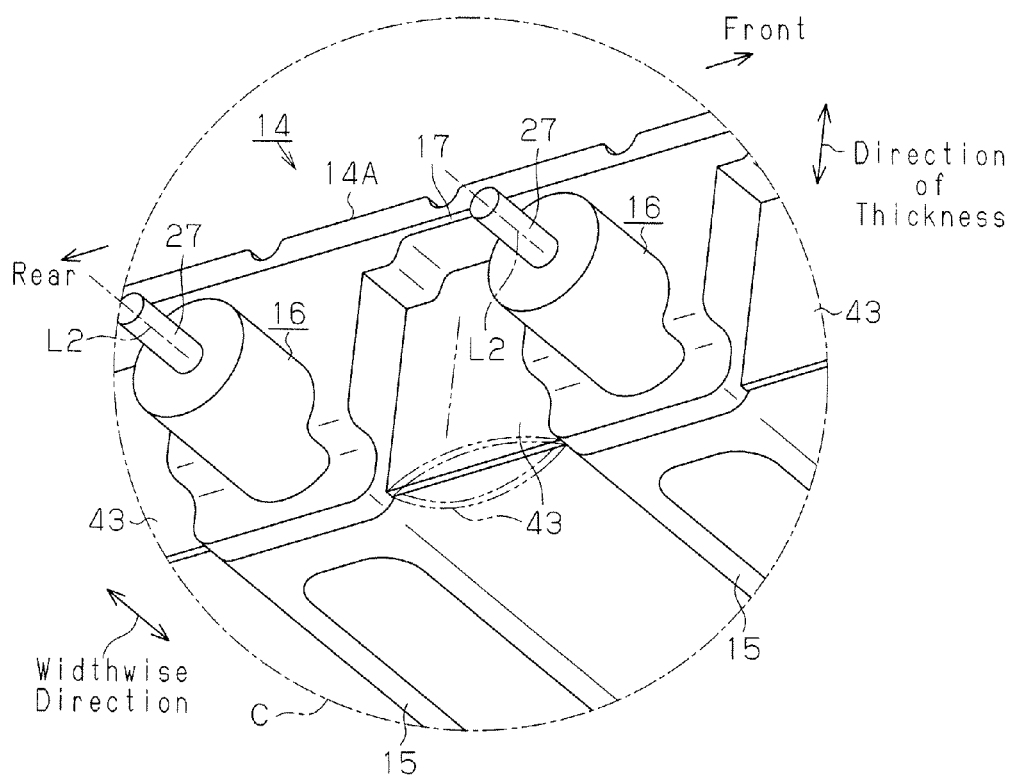
FIG. 15 is an enlarged perspective view showing the portion C of FIG. 13.
Figure 16:
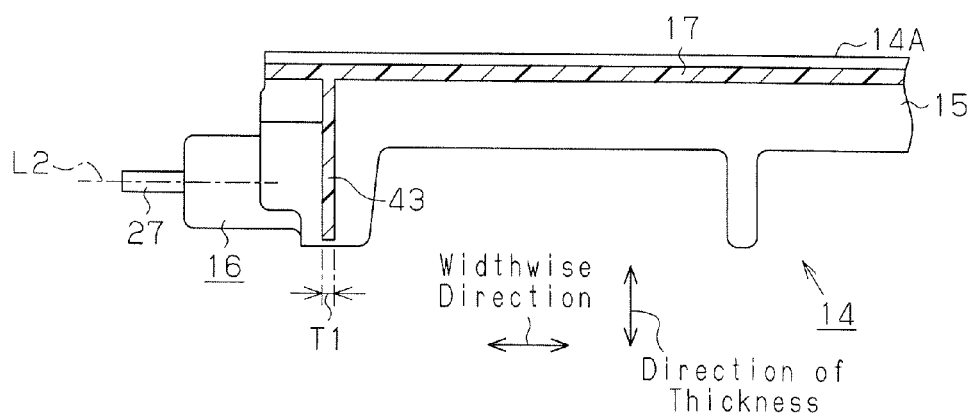
FIG. 16 is an enlarged cross-sectional view taken along line 16-16 of FIG. 14.

Specifically, each rib 43 is formed of the soft material and in a thin plate-like shape and elastically deformable as represented by the lines formed by a long dash alternating with two short dashes in FIG. 15. Such elastic deformation restricts the extent to which the ribs 43 reduce bendability (flexibility) of the roller shutter 14.

The fourth embodiment has the advantages described below in addition to the advantages similar to the above-described advantages (1) to (4) and (6).

(7) In the roller shutter type storage container 10 having the hinges 17 and the shafts 16 satisfying the aforementioned condition 1 in the roller shutter 14, the ribs 43, which are formed of soft material and restrict movement of the shafts 16, are arranged between each adjacent pair of the slats 15 (FIG. 15).

This decreases the interval i5 (the gap 42) between the upper surface 41A of the cover (the ornamental panel) 41 and the ornamental surface 14A of the roller shutter 14, thus improving the appearance of the roller shutter type storage container 10 (FIG. 17). The ribs 43 also prevent the shafts 16 from vibrating in the guide grooves 22, thus preventing generation of noise (rattling noise) caused through vibration. The ribs 43 decrease the flexibility of the roller shutter 14 only to a limited extent.

(8) The ribs 43 are provided for all adjacent pairs of the slats 15. Each pair of the ribs 43 are arranged between the corresponding adjacent pair of the slats 15 (FIG. 14).

This restricts vibration of the shafts 16 of all adjacent pairs of the slats 15 in the guide grooves 22, thus preventing generation of noise (rattling noise).

(9) The ribs 43 are arranged between each adjacent pair of the slats 15 and at the ends of the adjacent slats 15 in the widthwise direction (FIG. 15).

This arrangement efficiently restricts vibration of the shafts 16 in the guide grooves 22 at positions in the vicinities of the shafts 16.

(10) The thickness T1 of each rib 43 is set to a small value. In other words, the ribs 43 are formed thin (FIG. 16).

In addition to the soft material forming each rib 43, the small thickness T1 of the rib 43 facilitates the elastic deformation of the rib 43 as represented by the lines formed by a long dash alternating with two short dashes in FIG. 15. As a result, the extent to which the ribs 43 decrease the flexibility of the roller shutter 14 is further limited.

(11) A portion of each rib 43 is arranged in the space between the axes L2 of the corresponding shafts 16 and the associated hinge 17 in the thickness direction of the roller shutter 14 (FIG. 19).

Each rib 43 between the corresponding adjacent axes L2 transmits movement along the guide groove 22 between the corresponding shafts 16, thus preventing the moment acting to rotate the corresponding slats 15 about the hinge 17 acting as a fulcrum. The shafts 16 are thus prevented from vibrating in the guide grooves 22. As a result, generation of noise (rattling noise) is further reliably prevented.

(12) Each rib 43 has a portion arranged in the space spaced from the corresponding hinge 17 compared to the axes L2 of the associated shafts 16 in the thickness direction of the roller shutter 14, in addition to the portion described in the advantage (11) (FIG. 19).

As a result, since each rib 43 is extended to the side spaced from the corresponding hinge 17 with respect to the portion described in the advantage (11), movement of the corresponding shafts 16 is restricted effectively compared to an effect caused by the portion of the advantage (11) solely. This further reliably ensures the effect of preventing the generation of noise (rattling noise).

The present invention may be embodied in other forms as will be described.

Each hard portion HP may be formed of a hard material different from the hard material employed in the illustrated embodiments. Each soft portion SP may be formed of a soft material different from the soft material used in the illustrated embodiments.

In the first, third, and fourth embodiments, as long as the length L1 of each rod-like projection 27 (FIG. 4) is 1.5 times as great as the interval i2 between each shaft 16 and the vertical wall surface 23 of the corresponding guide groove 22 (FIG. 3) or greater, the interval i2 and the length L1 may be changed as needed.

In the first, third, and fourth embodiments, each rod-like projection 27 may flex in a manner bent at a middle portion in the longitudinal direction thereof (the aforementioned widthwise direction), thus contacting the corresponding vertical wall surface 23 in an elastically deformed state.

The second embodiment may employ the configuration of the third embodiment in which the lateral wall surfaces 24 are subjected to the surface roughening.

In the first to fourth embodiments, the surface roughening may be performed on not only the lateral wall surfaces 24 of each guide groove 22 but also the vertical wall surface 23 of the guide groove 22.

The present invention may be a type of roller shutter type storage container different from the type (corresponding to the first to fourth embodiments) having the opening 12 formed at the upper end of the container body 11 and the roller shutter 14 that slides in a horizontal direction. For example, the invention may be used in a type of roller shutter type storage container having an opening formed at the rear end of a container body and a roller shutter that slides in a vertical direction (an upward-downward direction). The invention may be used also in a type of roller shutter type storage container having a roller shutter that slides in a direction diagonally crossing a vertical surface or a horizontal surface.

Each guide groove 22 must include at least one curved portion in the roller shutter accommodating portion 13. That is, unlike the first to fourth embodiments, only a portion of each guide groove 22 may be curved in the roller shutter accommodating portion 13.

The projections 27 in the first, third, and fourth embodiments and the projections 31 in the second embodiment may be formed by independent members from the corresponding shafts 16.

In the first to fourth embodiments, the shafts 16 and the projections 27, 31 may be omitted from some of the slats 15.

In the first to fourth embodiments, some of the shafts 16 may be formed without a projection 27, 31.

For example, in a slat 15, a projection 27, 31 may be formed in one of the shafts 16 but not the other one of the shafts 16.

In this case, each adjacent pair of the slats 15 may be arranged in such a manner that the shaft 16 having the projection 27, 31 and the shaft 16 without a projection 27, 31 are located at mutually opposing sides. In this arrangement, the projections 27, 31 are arranged alternately in the shafts 16 sliding in the same one of the guide grooves 22. Also, for the shafts 16 sliding in one of the guide grooves 22 and the shafts 16 sliding in the other guide groove 22, the shafts 16 each having the projection 27, 31 and the shafts 16 without a projection 27, 31 are arranged at mutually opposing sides.

In the second embodiment, a rib 43 similar to those in the fourth embodiment may be arranged between each adjacent pair of the slats 15.

Description about generation of noise (the rattling noise) in the fourth embodiment has been based on the assumption that the shafts exist. However, as long as the roller shutter type storage container 10 has the hinges 17 and the shafts 16 that satisfy the condition 1, such noise generation may occur not only in the type having the projections 31 projecting from the shafts 16 but also in a type without such a projection.

Accordingly, arranging a rib 43 between each slat 15 and at least one of the corresponding adjacent slats 15 may be effective not only in the type of the roller shutter type storage container 10 having the projections 27 projecting from the shafts 16, but also a type without such a projection.

Figure 20:
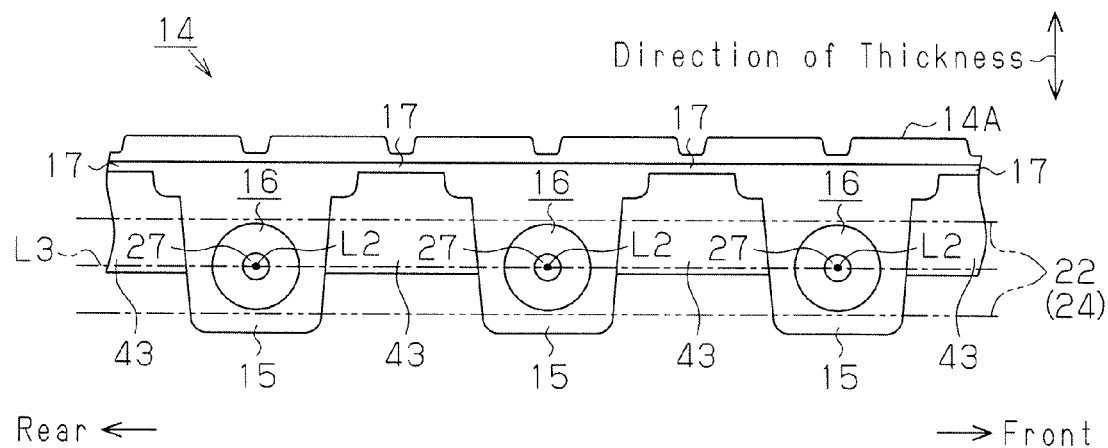
FIG. 20 is a side view corresponding to FIG. 19, showing a portion of a roller shutter of a modification in which ribs are provided only in spaces between hinges and shaft axes in the thickness direction of the roller shutter.

As illustrated in FIG. 20, each rib 43 in the fourth embodiment may be arranged only in the space between the corresponding hinge 17 and the axes L2 of the associated shafts 16 in the thickness direction of the roller shutter 14 (the upward-downward direction in FIG. 20).

Figure 21:
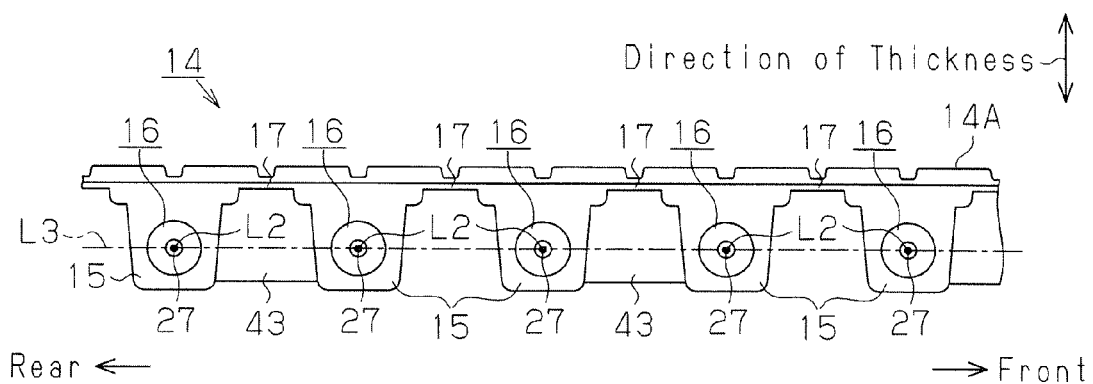
FIG. 21 is a side view corresponding to FIG. 19, or, specifically showing a portion of a roller shutter of another modification in which ribs are each formed in the space between each slat and one of its adjacent slats.

As illustrated in FIG. 21, in the roller shutter 14 according to the fourth embodiment, a rib 43 may be formed between each slat 15 and only one of the corresponding adjacent slats 15. In other words, no rib 43 is provided in the space between the slat 15 and the other one of the adjacent slats 15.

Figure 22:
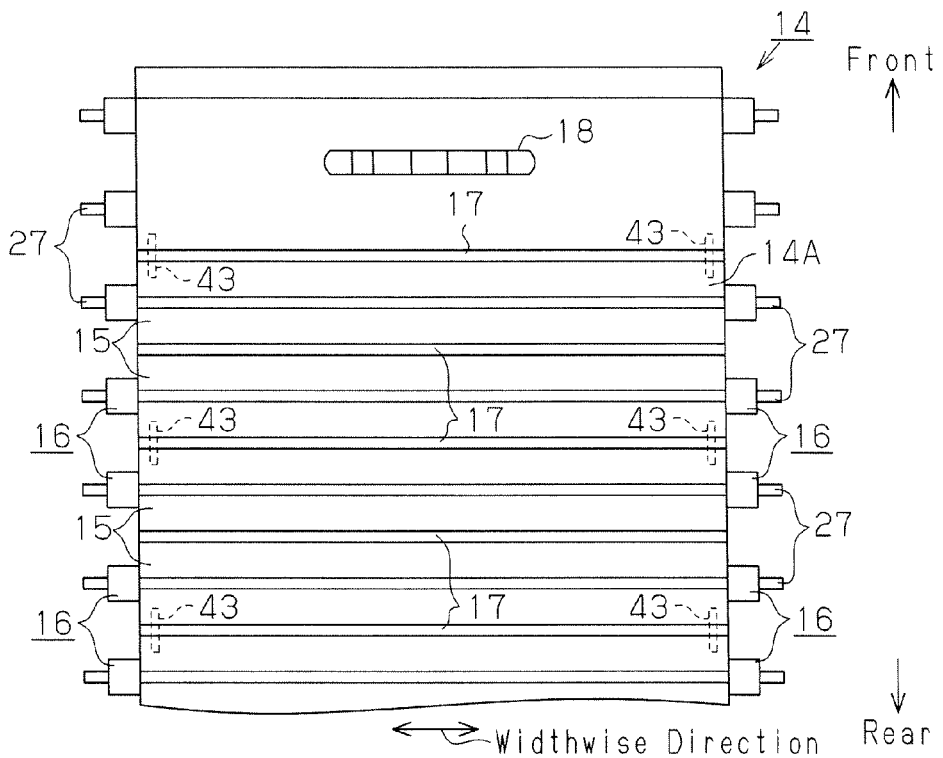
FIG. 22 is a plan view showing a portion of a modification of a roller shutter in which ribs are formed at positions different from corresponding positions in the fourth embodiment.

In this case, as illustrated in FIG. 22, adjacent pairs of the slats 15 may include pairs each having the ribs 43 at both sides in the widthwise direction and pairs that do not have a rib at either side.

Figure 23:
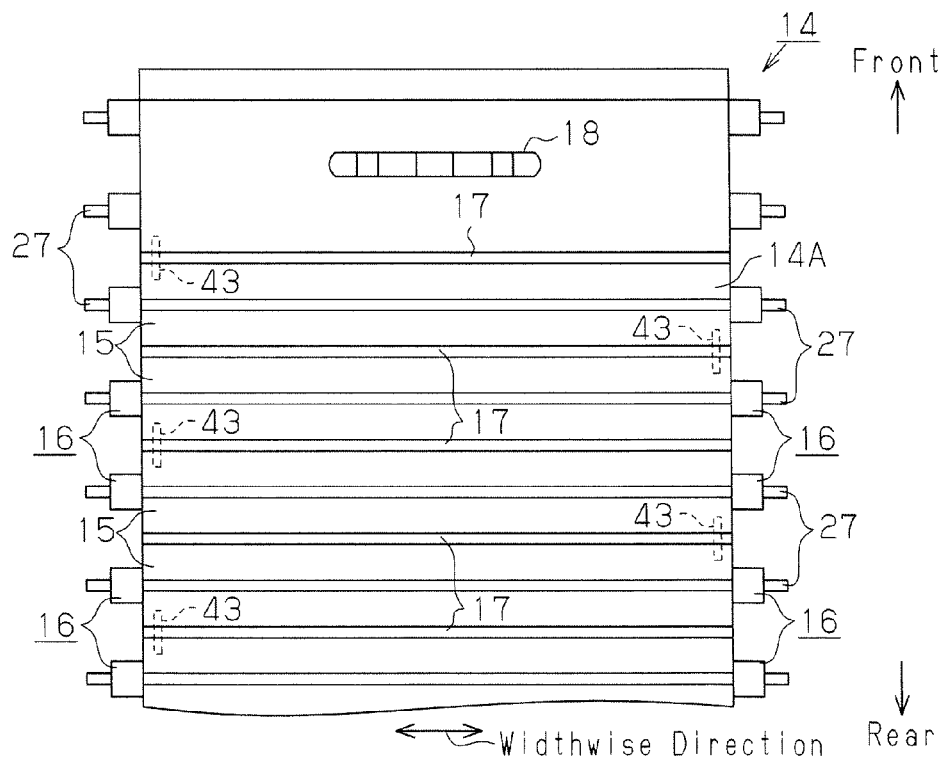
FIG. 23 is a plan view showing a portion of a modification of a roller shutter in which ribs are formed at positions different from corresponding positions in the fourth embodiment.

Alternatively, with reference to FIG. 23, the adjacent pairs of the slats 15 may include pairs each having a rib 43 only at one side in the widthwise direction and pairs each having a rib 43 only at the opposite side in the widthwise direction.

The ribs 43 may be arranged at positions different from the ends in the widthwise direction in the space between each adjacent pair of the slats 15.

The ribs 43 may be formed independently from the soft portions SP of the roller shutter 14.

The present invention is usable also in a roller shutter type storage container incorporated in a member different from a center console in a vehicle.

Therefore, the present examples and embodiments are to be considered as illustrative and not restrictive and the invention is not to be limited to the details given herein, but may be modified within the scope and equivalence of the appended claims.

The invention claimed is:

1. A roller shutter storage container comprising:
   a container body having an opening;
   a roller shutter accommodating portion arranged along a first direction so as to be adjacent to the container body;
   a pair of guide grooves formed in the opening of the container body and the roller shutter accommodating portion at both sides in the widthwise direction, which is a second direction perpendicular to the first direction, each of the guide grooves forming a straight shape in the opening, at least a portion of each guide groove being curved in the roller shutter accommodating portion, the guide grooves extending along the first direction; and
   a roller shutter guided by the two guide grooves, wherein
   the roller shutter includes a plurality of slats arranged along the first direction and connected together in a bendable manner, each of the slats having two ends in the second direction and shafts at the ends,
   as the shafts of each of the slats slide in the corresponding guide grooves, the roller shutter slides between an open position and a close position, in the open position the roller shutter is accommodated in the roller shutter accommodating portion to open the opening, and in the close position the roller shutter extends out from the roller shutter accommodating portion to close the opening,
   each of the guide grooves has a vertical wall surface extending in a direction substantially perpendicular to the second direction, and
   each one of the shafts is spaced from the corresponding one of the vertical wall surfaces, the shafts of at least some of the slats having projections formed of soft material and projecting outward along the second direction, each of the projections being held in contact with the corresponding vertical wall surface in an elastically deformed state,
   the roller shutter has an ornamental surface with respect to the thickness direction of the roller shutter,
   each adjacent pair of the slats is connected together through a hinge located at a position proximal to the ornamental surface,
   each of the shafts is located at a position separated by a predetermined distance from the hinge in the thickness direction of the roller shutter, and
   a rib plate formed of soft material is arranged between each one of the slats and at least one of the two adjacent slats, the rib plate extending from and being connected to a bottom surface of the slats opposite the ornamental surface the rib plate extending across the hinge and between axes of the shafts of the one of the two adjacent slats, the rib plate restricting movement of the shafts of the corresponding slats relative to the corresponding guide, and the rib preventing rotational movement of the corresponding slats about the hinge as a fulcrum.

2. The roller shutter storage container according to claim 1, wherein, before being elastically deformed, each of the projections is shaped like a rod and projects outward along the second direction from the corresponding one of the shafts.

3. The roller shutter storage container according to claim 1, wherein
   the length of each projection is set to a value that is 1.5 times as great as the interval between each shaft and the vertical wall surface of the corresponding guide groove or greater.

4. The roller shutter storage container according to claim 1, wherein
   each guide groove has a pair of opposing lateral wall surfaces each extending substantially perpendicular to the associated vertical wall surface, and
   surface roughening is performed on the lateral wall surfaces to increase surface roughness of the lateral wall surfaces, with grease being applied on the lateral wall surfaces.

5. The roller shutter storage container according to claim 1, wherein the rib extends in the thickness direction of the roller shutter at least at a position between the axes of the corresponding shafts and the hinge.

6. A roller shutter storage container comprising:
   a container body having an opening;
   a roller shutter accommodating portion arranged along a first direction so as to be adjacent to the container body;
   a pair of guide grooves formed in the opening of the container body and the roller shutter accommodating portion at both sides in the widthwise direction, which is a second direction perpendicular to the first direction, each of the guide grooves forming a straight shape in the opening, at least a portion of each guide groove being curved in the roller shutter accommodating portion, the guide grooves extending along the first direction; and
   a roller shutter guided by the two guide grooves, wherein
   the roller shutter includes a plurality of slats arranged along the first direction and connected together in a bendable manner, each of the slats having two ends in the second direction and shafts at the ends,
   as the shafts of each of the slats slide in the corresponding guide grooves, the roller shutter slides between an open position and a closed position, in the closed position the roller shutter is accommodated in the roller shutter accommodating portion to open the opening, and in the close position the roller shutter extends out from the roller shutter accommodating portion to close the opening, each of the guide grooves has a vertical wall surface extending in a direction substantially perpendicular to the second direction, and each one of the shafts is spaced from the corresponding one of the vertical wall surfaces, the shafts of at least some of the slats having projections formed of soft material and projecting outward along the second direction, each of the projections being held in contact with the corresponding vertical wall surface in an elastically deformed state, the roller shutter has an ornamental surface with respect to the thickness direction of the roller shutter, each adjacent pair of the slats is connected together through a hinge located at a position proximal to the ornamental surface, each of the shafts is located at a position separated by a predetermined distance from the hinge in the thickness direction of the roller shutter, a rib formed of soft material is arranged between each one of the slats and at least one of the two adjacent slats, the rib restricts movement of the shafts of the corresponding slats by preventing movement acting to rotate the corresponding slats about the hinge as a fulcrum from being produced, and the rib extends to a position farther from the hinge than the axes of the shafts with respect to the thickness direction of the roller shutter,

7. The roller shutter storage container according to claim 1, wherein the rib plate maintains the adjacent slats to be parallel with respect to a sliding direction of the roller shutter.

8. The roller shutter storage container according to claim 1, wherein the rib plate restricts movement of the adjacent slats from approaching with each other.

9. A roller shutter storage container comprising:
a container body having an opening;
a roller shutter accommodating portion arranged along a first direction so as to be adjacent to the container body;
a pair of guide grooves formed in the opening of the container body and the roller shutter accommodating portion at both sides in the widthwise direction, which is a second direction perpendicular to the first direction, each of the guide grooves forming a straight shape in the opening, at least a portion of each guide groove being curved in the roller shutter accommodating portion, the guide grooves extending along the first direction; and
a roller shutter guided by the two guide grooves, wherein the roller shutter includes a plurality of slats arranged along the first direction and connected together in a bendable manner, each of the slats having two ends in the second direction and shafts at the ends,
as the shafts of each of the slats slide in the corresponding guide grooves, the roller shutter slides between an open position and a close position, in the open position the roller shutter is accommodated in the roller shutter accommodating portion to open the opening, and in the close position the roller shutter extends out from the roller shutter accommodating portion to close the opening, each of the guide grooves has a vertical wall surface extending in a direction substantially perpendicular to the second direction, and each one of the shafts is spaced from the corresponding one of the vertical wall surfaces, the shafts of at least some of the slats having projections formed of soft material and projecting outward along the second direction, each of the projections having an end wall backed by a hollow portion, the end wall being held in contact with the corresponding vertical wall surface in an elastically deformed state including the end wall flexing toward the shaft and compressing the hollow portion, the roller shutter has an ornamental surface with respect to the thickness direction of the roller shutter, each adjacent pair of the slats is connected together through a hinge located at a position proximal to the ornamental surface, and each of the shafts is located at a position separated by a predetermined distance from the hinge in the thickness direction of the roller shutter.

10. The roller shutter storage container according to claim 9, further comprising a rib formed of soft material arranged between each one of the slats and at least one of the two adjacent slats, the rib restricting movement of the shafts of the corresponding slats and the rib preventing rotational movement of the corresponding slats about the hinge as a fulcrum.

11. The roller shutter storage container according to claim 9, wherein
each projection has two ends in the first direction and the end wall includes a plate-shaped portion connected to the associated shaft at the two ends, and
the hollow portion is formed between the shaft and the plate-shaped portion.

12. The roller shutter storage container according to claim 11, wherein, before being elastically deformed, the plate-shaped portion of each projection is curved substantially in such an arcuate shape that the plate-shaped portion becomes more spaced from the associated shaft at positions more separate from the two ends of the projection.

13. The roller shutter storage container according to claim 10, wherein
each projection has two ends in the first direction and the end wall includes a plate-shaped portion connected to the associated shaft at the two ends, and
the hollow portion is formed between the shaft and the plate-shaped portion

14. The roller shutter storage container according to claim 13, wherein, before being elastically deformed, the plate-shaped portion of each projection is curved substantially in such an arcuate shape that the plate-,shaped portion becomes more spaced from the associated shaft at positions more separate from the two ends of the projection.

* * * * *